United States Patent
Kanamoto et al.

(10) Patent No.: US 7,715,633 B2
(45) Date of Patent: May 11, 2010

(54) MEDIUM PROCESSING APPARATUS, MEDIUM PROCESSING METHOD, MEDIUM PROCESSING SYSTEM AND COMPUTER READABLE RECORDING MEDIUM WITH MEDIUM PROCESSING PROGRAM RECORDED THEREON

(75) Inventors: Koichi Kanamoto, Inagi (JP); Shinichi Eguchi, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 1050 days.

(21) Appl. No.: 11/411,086

(22) Filed: Apr. 26, 2006

(65) Prior Publication Data
US 2007/0147710 A1 Jun. 28, 2007

(30) Foreign Application Priority Data
Dec. 28, 2005 (JP) ............................. 2005-378617

(51) Int. Cl.
*G06K 9/46* (2006.01)
*G06K 9/66* (2006.01)

(52) U.S. Cl. ................. 382/190; 358/488; 382/139; 382/176; 382/229; 382/310; 715/251

(58) Field of Classification Search ............... 358/1.13, 358/1.15, 1.18, 403; 382/190, 321; 715/541
See application file for complete search history.

(56) References Cited

U.S. PATENT DOCUMENTS

| | | | |
|---|---|---|---|
| 6,341,176 B1 * | 1/2002 | Shirasaki et al. ............. | 382/229 |
| 6,360,011 B1 | 3/2002 | Katsumata et al. | |
| 6,950,202 B1 * | 9/2005 | Kikugawa .................. | 358/1.15 |
| 7,170,615 B2 * | 1/2007 | Maeda et al. .............. | 358/1.13 |
| 7,305,619 B2 * | 12/2007 | Kaneda et al. .............. | 715/273 |
| 2001/0051905 A1 | 12/2001 | Lucas | |
| 2002/0025081 A1 * | 2/2002 | Kumazawa .................. | 382/289 |
| 2003/0123727 A1 * | 7/2003 | Kanatsu ....................... | 382/173 |
| 2003/0229859 A1 * | 12/2003 | Shiraishi et al. ............. | 715/541 |
| 2004/0161149 A1 * | 8/2004 | Kaneda et al. .............. | 382/181 |
| 2005/0171914 A1 * | 8/2005 | Saitoh ......................... | 705/51 |
| 2005/0281450 A1 * | 12/2005 | Richardson .................. | 382/139 |
| 2006/0157559 A1 * | 7/2006 | Levy et al. ................... | 235/380 |

(Continued)

FOREIGN PATENT DOCUMENTS

JP          6-141123          5/1994

(Continued)

*Primary Examiner*—Gregory M Desire
(74) *Attorney, Agent, or Firm*—Westerman, Hattori, Daniels & Adrian, LLP

(57) ABSTRACT

The present invention comprises, in order to allow recognition of content of information indicated in a medium accurately, based on an image data obtained by reading a medium, an extraction unit for extracting each of plural information items from an image data obtained by reading a medium in which each of plural information items satisfying a predetermined relationship is indicated in plural areas, a recognition unit for recognizing content of each of plural information items, and a confirmation unit which evaluates whether or not content of plural information items recognized by the recognition unit is correct based on the predetermined relationship, and confirms content of plural information items as recognized by the recognition unit if correct, and executes correction of recognition content recognized by the recognition unit if incorrect, based on the predetermined relationship, to confirm content of plural information items.

20 Claims, 32 Drawing Sheets

U.S. PATENT DOCUMENTS

2007/0170250 A1 * 7/2007 Bystrom et al. ............ 235/382

FOREIGN PATENT DOCUMENTS

| | | |
|---|---|---|
| JP | 8-258356 | 10/1996 |
| JP | 8-335247 | 12/1996 |
| JP | 10-320488 | 12/1998 |
| JP | 2002-29985 | 1/2000 |
| JP | 2001-5886 | 1/2001 |
| JP | 2001-328707 | 11/2001 |
| JP | 2002-192785 | 7/2002 |
| JP | 2002-215800 | 8/2002 |
| JP | 2002-334162 | 11/2002 |
| JP | 2003-168075 | 6/2003 |
| JP | 2003-526166 | 9/2003 |
| JP | 2003-303315 | 10/2003 |
| JP | 2004-54749 | 2/2004 |
| JP | 2005-31932 | 2/2005 |
| WO | WO 97/05561 | 2/1997 |
| WO | WO 01/67356 | 9/2001 |

* cited by examiner

| FIRST DOCUMENT ID | SECOND DOCUMENT ID |
|---|---|
| 100 | 900 |
| 101 | 899 |
| 102 | 898 |
| ⋮ | ⋮ |
| 237 | 763 |
| ⋮ | ⋮ |
| 898 | 102 |
| 899 | 101 |
| 900 | 100 |

FIG. 4

| NUMERICAL CHARACTER IN FIRST DOCUMENT ID | 0 | 1 | 2 | 3 | 4 | 5 | 6 | 7 | 8 | 9 |
|---|---|---|---|---|---|---|---|---|---|---|
| NUMERICAL CHARACTER IN SECOND DOCUMENT ID | 5 | 8 | 9 | 6 | 7 | 0 | 3 | 4 | 1 | 2 |

FIG. 5

| FIRST DOCUMENT ID | SECOND DOCUMENT ID |
|---|---|
| 100 | 855 |
| 101 | 858 |
| 102 | 859 |
| ⋮ | ⋮ |
| 237 | 964 |
| ⋮ | ⋮ |
| 498 | 721 |
| 499 | 722 |
| 500 | 055 |

| ORDER (RECOGNITION RATE) | 1 | 2 | 3 | 4 | 5 | 6 | 7 | 8 | 9 | 10 |
|---|---|---|---|---|---|---|---|---|---|---|
| CHARACTER (NUMERICAL CHARACTER) | 1 | 3 | 7 | 5 | 9 | 2 | 0 | 4 | 6 | 8 |

COVERAGE RELATIONSHIP

FIG. 7

|  | FIRST DOCUMENT ID | SECOND DOCUMENT ID | DOCUMENT DISCRIMINATION RATE | DOCUMENT DISCRIMINATION IMPOSSIBLE RATE | DIFFERENCE |
|---|---|---|---|---|---|
| CASE 1 | "8888" | "8888" |  |  |  |
| RECOGNITION RATE | 99.99%^4 | 99.99%^4 | (99.99% × 99.99%)^4 | 0.080% |  |
| CASE 2 | "8888" | "1111" |  |  |  |
| RECOGNITION RATE | 99.99%^4 | 99.999%^4 | (99.99% × 99.999%)^4 | 0.044% | −0.036% |

SIMILAR CHARACTER GROUP 1

SIMILAR CHARACTER GROUP 2

FIG. 13

| ID | X-COORDINATES | X-COORDINATES | NUMBER OF DIGITS | CD | TYPE OF CHARACTER |
|---|---|---|---|---|---|
| 1 | X1 | Y1 | 4 | LEADING END | NUMERIC CHARACTER |
| 2 | X2 | Y2 | 4 | END | NUMERIC CHARACTER |

| TYPE OF DOCUMENT | ID | X-COORDINATES | X-COORDINATES | NUMBER OF DIGITS | CD | TYPE OF CHARACTER |
|---|---|---|---|---|---|---|
| TYPE 01 | 1 | X11 | Y11 | 4 | LEADING END | NUMERIC CHARACTER |
| TYPE 01 | 2 | X12 | Y12 | 4 | END | NUMERIC CHARACTER |
| TYPE02 | 1 | X21 | Y21 | 6 | LEADING END | LPHABETICAL CHARACTER |
| TYPE02 | 2 | X22 | Y22 | 6 | END | LPHABETICAL CHARACTER |

12b

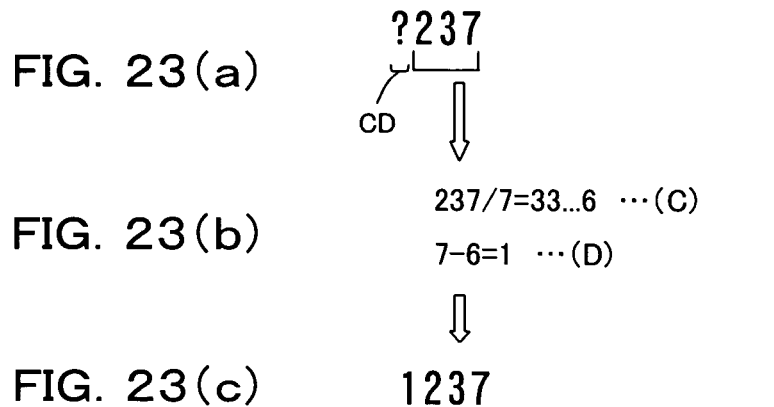
FIG. 23(a)
FIG. 23(b)
FIG. 23(c)
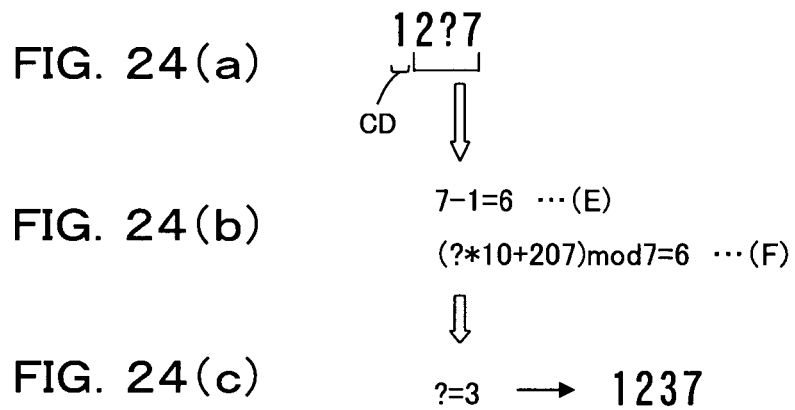
FIG. 24(a)
FIG. 24(b)
FIG. 24(c)
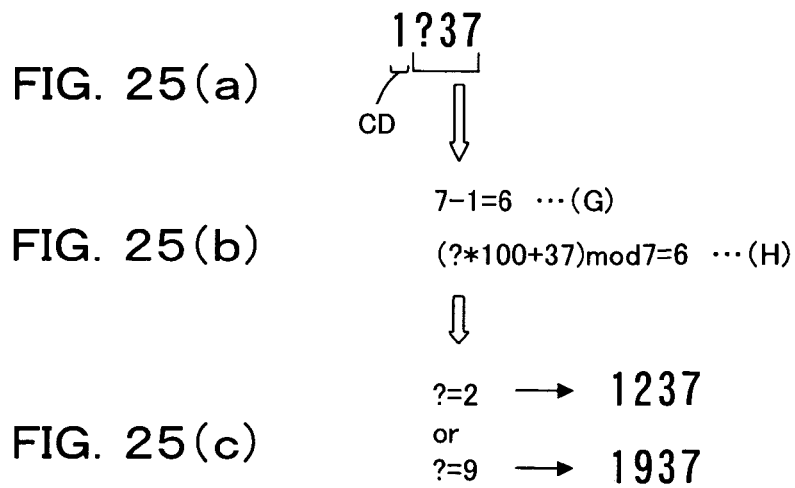
FIG. 25(a)
FIG. 25(b)
FIG. 25(c)

| DOCUMENT ID | | NAME OF DOCUMENT | CHARACTER RECOGNITION ITEM (DESCRIPTION CONTENT) | |
|---|---|---|---|---|
| 1 | 2 | TYPE | ITEM NAME | DATE |
| 1237 | 1237 | X | COORDINATES 1, TYPE OF CHARACTER 1, NUMBER OF CHARACTERS 1 | JAPANESE CALENDAR |
| 2254 | 8763 | Y | COORDINATES 2, TYPE OF CHARACTER 2, NUMBER OF CHARACTERS 2 | JAPANESE CALENDAR |
| 5896 | 7508 | Z | COORDINATES 3, TYPE OF CHARACTER 3, NUMBER OF CHARACTERS 3 | WESTERN CALENDAR |
| ... | ... | ... | ... | ... |

21a

FIG. 32(a)
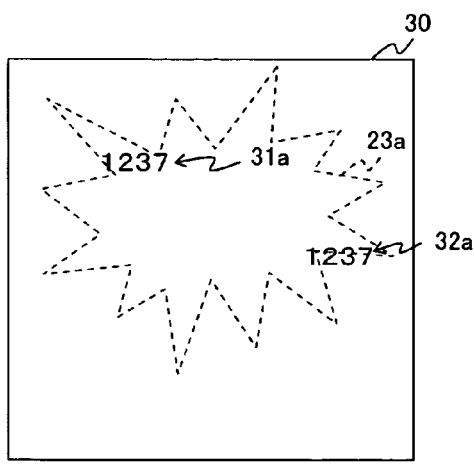
FIG. 32(b)
|  | FIRST DOCUMENT ID 31a | SECOND DOCUMENT ID 32a |
|---|---|---|
| RECOGNITION RESULT | ? ? 37 | 1 2 ? ? |
FIG. 33(a)
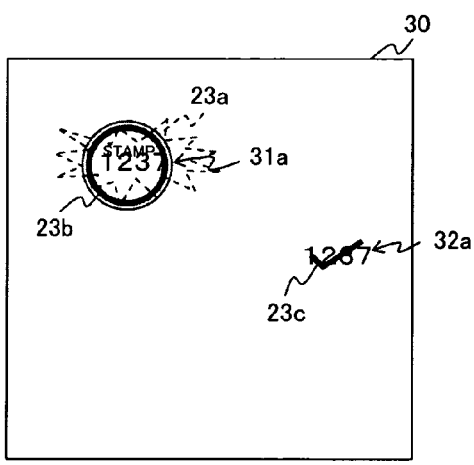
FIG. 33(b)
|  | FIRST DOCUMENT ID 31a | SECOND DOCUMENT ID 32a |
|---|---|---|
| RECOGNITION RESULT | ? ? ? ? | ? ? ? ? |

|  | FIRST DOCUMET ID31a | SECOND DOCUMENT ID32a |
|---|---|---|
| RECOGNITION RESULT | ? 237 | 1237 |

FIRST DOCUMENT ID31a
"? 237"

SECOND DOCUMENT ID32a
"1237"

DOCUMENT ID's 31a AND 32a ARE CORRECTED TO "1237"

FIG. 42(a)
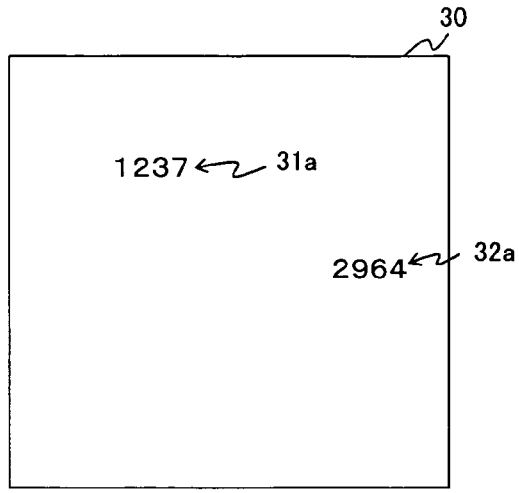
FIG. 42(b)
|  |  | FIRST DOCUMENT ID x | | | | SECOND DOCUMENT ID x | | | |
| --- | --- | --- | --- | --- | --- | --- | --- | --- | --- |
| FIRST PLACE | CANDIDATE CHARACTER | 1 | 7 | 3 | 7 | 2 | 9 | 8 | 4 |
|  | COINCIDENCE DEGREE (%) | 90 | 60 | 90 | 90 | 80 | 90 | 65 | 60 |
| SECOND PLACE | CANDIDATE CHARACTER | 7 | 2 | 8 | 1 | 7 | 4 | 6 | 9 |
|  | COINCIDENCE DEGREE (%) | 10 | 40 | 10 | 10 | 20 | 10 | 35 | 40 |
FIG. 42(c)
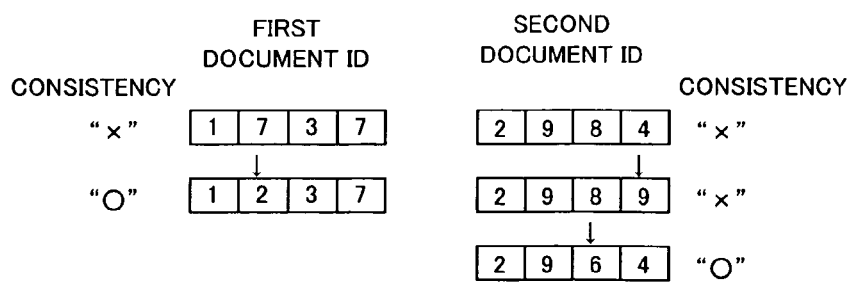

| | FIRST DOCUMENT ID 31a | SECON DOCUMENT ID 32a |
|---|---|---|
| RECOGNITION RESULT | "?237" | "?237" |

FIG. 44(a)

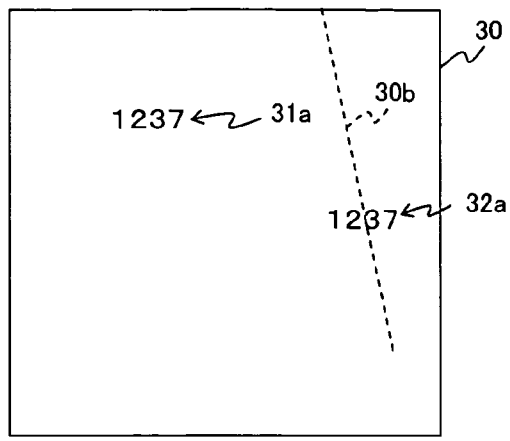

FIG. 44(b)

| | FIRST DOCUMENT ID 31a | SECON DOCUMENT ID 32a |
|---|---|---|
| RECOGNITION RESULT | 1237 | 1287 |

FIG. 44(c)

| THIRD DIGIT | FIRST PLACE | | SECOND PLACE | | DIFFERENCE |
| | CHARACT-ERS | COINSIDENCE DEGREE (%) | CHARACT-ERS | COINSIDENCE DEGREE (%) | COINSIDENCE DEGREE (%) |
|---|---|---|---|---|---|
| FIRST DOCUMENT ID | 3 | 90 | 8 | 40 | 50 |
| SECOND DOCUMENT ID | 8 | 60 | 3 | 40 | 20 |

FIG. 44(d)

| THIRD DIGIT | FIRST PLACE | | SECOND PLACE | | DIFFERENCE |
| | CHARACT-ERS | COINSIDENCE DEGREE (%) | CHARACT-ERS | COINSIDENCE DEGREE (%) | COINSIDENCE DEGREE (%) |
|---|---|---|---|---|---|
| FIRST DOCUMENT ID | 3 | 90 | 8 | 40 | 50 |
| SECOND DOCUMENT ID | 8 | 90 | 3 | 70 | 20 |

FIG. 44(e)

| FIRST PLACE | | SECOND PLACE | | DIFFERENCE |
| CHARACTERS | COINSIDENCE DEGREE (%) | CHARACTERS | COINSIDENCE DEGREE (%) | COINSIDENCE DEGREE (%) |
|---|---|---|---|---|
| : | : | : | : | : |
| 3 | 90 | 8 | 40 | 50 |
| : | : | : | : | : |
| 8 | 90 | 3 | 40 | 50 |
| : | : | : | : | : |

MEDIUM PROCESSING APPARATUS, MEDIUM PROCESSING METHOD, MEDIUM PROCESSING SYSTEM AND COMPUTER READABLE RECORDING MEDIUM WITH MEDIUM PROCESSING PROGRAM RECORDED THEREON

BACKGROUND OF THE INVENTION

1) Field of the Invention

The present invention relates to a technology for discriminating a medium (e.g., a document, a ledger sheet) based on an image data obtained by reading the medium on which information are indicated, and particularly relates to a technology for recognizing content of the information indicated in the medium with high accuracy.

2) Description of the Related Art

As an apparatus performing data medium recognition or character recognition by reading a data medium (for example, a document, a ledger sheet), as image data, on which information such as characters, codes, numeric characters, pictures, ruled lines, barcodes and so forth are indicated, there have been developed in these years document recognition apparatuses such as an optical character reading apparatus [OCR (Optical Character Recognition/Reader) apparatus] and the like. Various kinds of industries make widely use of the document recognition apparatus to improve, for example, the efficiency of the business.

For example, an operator doing the window working in a financial organ or the like uses the document recognition apparatus to efficiently handle document media (hereinafter, referred to simply documents), thereby improving the efficiency of his/her work.

With respect to such document recognition apparatus, there is a technique of not only handling a large amount of the same kind of documents but also automatically handling documents in various formats in order to carry out the document handling more efficiently (refer to Patent Documents 1 and 2 below, for example).

In some cases, for the sake of efficiency improvement of document processing jobs, it is required to process collectively and automatically a plurality of document groups with different types. For example, as frequently seen after merger and abolition of financial facilities, when a plurality of document groups each having a different format of a different financial facility should be consolidated to one system or when document groups of a plurality of regional offices (branch offices) should be processed collectively by headquarter (main office) organization or the like (centralized processing), it is required that a plurality of document groups each different in their types should be processed together.

Meanwhile, with conventional technology used to date to process a plurality of document groups with different types highly efficiently and with higher accuracy, an identification document on which document group information for identifying type of the document group is recorded (indicated) content and number of sheets or the like is inserted at front line of each of the document groups, a medium recognition apparatus first identifies this identification document prior to processing each of documents in a document group, and having recognized type and number of sheets of a document group following this identification document, and then processing of these document group is carried out.

Specifically, for example, an identification document 100 as shown in FIG. 48 is disposed at front line of each of document group and reading of a document group is then executed. That is, a document ID (numeric character "1234" in this example) is recorded (added) to the identification document 100 to recognize identification document 100 itself and further, document group information such as type of subsequent document group ("P" in this example), number of sheets ("500 sheets" in this example) or the like are recorded.

Hence, having read this identification document 100 and document group by a scanner apparatus as an image data, the document identification apparatus first recognizes the document ID of the identification document 100 at the front line and discriminates the identification document 100.

In other words, the document identification apparatus discriminates what document group information is recorded where in the identification document 100 based on information, which shows a correspondence between a document ID, and place of recorded portion and recorded item of the document group information in the identification document, maintained in advance in a database or the like, and then recognizes content of such document group information.

Due to this, the document recognition apparatus can execute effectively recognition of content of document groups following to the identification document 100, and recognition processing can be executed effectively for a plurality of document groups each different in types.

Further, similar to the identification document 100, a document ID is recorded in each of documents in document group and when the document recognition apparatus recognizes each document, it discriminates what information is discribed in where of the document by recognizing this document ID first.

Due to this, the document recognition apparatus can perform recognition processing effectively for each of documents.

By the way, with conventional document recognition apparatus mentioned above, processing for recognizing a document ID in an identification document and processing for recognizing a document ID in each of documents constituting a document group are very important.

Therefore, these document IDs should be recognized with high-accuracy.

However, a document recognition apparatus is not necessarily capable of recognizing characters with 100% recognition rate and there is a limitation in accuracy for character recognition, and there is a possibility that a document ID is recognized erroneously and moreover, characters constituting a document ID are rejected (that is to say, one character can not be recognized as one character) or in the worst case, a document ID is not recognized at all.

When a document ID is not recognized correctly as is the case shown above, correction processing is required after automatic document processing (recognition processing) by a document recognition apparatus is once interrupted, and the document, the document ID of which was not recognized correctly, should be read again by a scanner apparatus or an operator inputs the document ID of the document.

When processing is once interrupted due to correction processing as mentioned above while a plurality of document groups each different in types is being recognized automatically by the document recognition apparatus, a great delay is caused in processing.

Therefore, it is desired that a document ID should be recognized with high-accuracy to allow discrimination of documents with high-accuracy.

Incidentally, in order to realize higher accuracy recognition processing, one idea emerged is to improve resolution of a scanner apparatus for reading a document as an image data. However, if resolution of the scanner apparatus is improved, processing speed is reduced on the contrary or character recognition accuracy is reduced though slightly. This tendency is remarkable especially with high-speed scanners compared with medium-speed machines.

[Patent Document 1] International publication No. WO97/05561

[Patent Document 2] Japanese Patent Laid-Open (Kokai) No. 2003-168075

SUMMARY OF THE INVENTION

The present invention is formulated considering above-mentioned problems, and an object of the present invention is high-accuracy recognition of a medium based on an image data obtained by reading the medium, for example, a document on which information is indicated, and especially further object is to recognize content of information recorded in a medium with high-accuracy.

A medium processing apparatus to accomplish above-mentioned object comprises: an extraction unit for extracting, from an image data obtained by reading a medium on which a plurality of information items satisfying a predetermined relationship are indicated in a plurality of areas, each of the plurality of information items; a recognition unit for recognizing content of each of the plurality of information items extracted by the extraction unit; and a confirmation unit which evaluates whether or not content of the plurality of information items recognized by the recognition unit is correct based on the predetermined relationship, and confirms, if the evaluation reveals a positive result, content of the plurality of information items as recognized by the recognition unit, and executes, if the evaluation reveals a negative result, correction of recognition content recognized by the recognition unit, based on the predetermined relationship, to confirm content of the plurality of information items.

It is preferable that the medium processing apparatus further comprising a medium discrimination unit for discriminating the medium based on content of the information after content of said information is confirmed by the confirmation unit Further, in order to accomplish above-mentioned object, the medium processing method of the present invention comprises the steps of: extracting, from an image data obtained by reading a medium on which a plurality of information items satisfying a predetermined relationship are indicated in a plurality of areas, each of the plurality of information items; recognizing content of each of the plurality of information items being extracted; evaluating whether or not content of the plurality of information items being recognized is correct based on the predetermined relationship; confirming, if the evaluation reveals a positive result, content of the plurality of information items as recognized; and executing, if the evaluation reveals a negative result, correction of recognition content recognized, based on the predetermined relationship, to confirm content of the plurality of information items.

Moreover, in order to accomplish above-mentioned object, the medium processing system of the present invention comprises: a medium on which a plurality of information items satisfying a predetermined relationship are indicated in a plurality of areas; a scanner apparatus for obtaining an image data of the medium by reading the medium; and a medium processing apparatus for recognizing content of the information based on the image data obtained by the scanner apparatus, wherein the medium processing apparatus including; an extraction unit for extracting each of the plurality of information items from the image data; a recognition unit for recognizing content of each of the plurality of information items extracted by the extraction unit; and a confirmation unit which evaluates whether or not content of the plurality of information items recognized by the recognition unit is correct based on the predetermined relationship, and confirms, if the evaluation reveals a positive result, content of the plurality of information items as recognized by the recognition unit, and executes, if the evaluation reveals a negative result, correction of recognition content recognized by the recognition unit, based on the predetermined relationship, to confirm content of the plurality of information items.

Furthermore, in order to accomplish above-mentioned object, in a computer readable recording medium of the present invention is recorded a medium processing program to cause a computer to realize functions for recognizing content of the information, based on an image data obtained by reading a medium on which a plurality of information items satisfying a predetermined relationship are indicated in a plurality of areas, the medium processing program causing the computer to function as: an extraction unit for extracting each of the plurality of information items from the image data; a recognition unit for recognizing content of each of the plurality of information items extracted by the extraction unit; and a confirmation unit which evaluates whether or not content of the plurality of information items recognized by the recognition unit is correct based on the predetermined relationship, and confirms, if the evaluation reveals a positive result, content of the plurality of information items as recognized by the recognition unit, and executes, if the evaluation reveals a negative result, correction of recognition content recognized by the recognition unit, based on the predetermined relationship, to confirm content of the plurality of information items.

As mentioned, according to the present invention, the confirmation unit evaluates whether or not recognition content by the recognition unit is correct in recognizing a medium on which a plurality of information items satisfying a predetermined relationship are indicated, and when evaluated to be incorrect, corrects the plurality of information items in the medium based on the predetermined relationship to confirm content of these information, and therefore, recognition of content of the plurality of information items indicated in the medium can be performed with high-accuracy.

Further, since it is possible to recognize with high-accuracy content of the plurality of information items indicated in a medium, a medium discrimination unit can execute discrimination of a medium surely, and as a result, time consuming event such as re-reading of the medium by a scanner apparatus, manual input by an operator or the like, which interrupts automatic processing by a document recognition apparatus of the present invention, can be suppressed thereby allowing effective and high-speed discrimination processing of the medium.

BRIEF DESCRIPTION OF THE DRAWINGS

FIG. 4 is a drawing explaining one-on-one correspondence relationship between characters constituting the first document ID and characters constituting the second document ID of the document shown in FIG. 2.

FIG. 5 is a drawing explaining a relationship between the first document ID and the second document ID of the document shown in FIG. 2.

FIG. 6(a) is a drawing showing recognition rate of each of characters and FIG. 6(b) is a drawing showing one-on-one correspondence relationship of each of characters.

FIG. 7 is a drawing explaining recognition rate for a case where the first document ID and the second document ID of the document shown in FIG. 2 satisfy one-on-one correspondence relationship shown in FIG. 4.

FIG. 8(a) is a drawing showing recognition rate of their candidate characters, FIG. 8(b) and FIG. 8(c) are drawings each explaining similar characters in the candidate characters, and FIG. 8(d) is a drawing showing recognition rate of each of characters constituting the document and each of characters.

FIG. 9(a) is a drawing showing recognition rate of characters constituting the document, FIGS. 9(b) to 9(d) are drawings each explaining similar characters in characters shown in FIG. 9(a), and FIG. 9(e) is a drawing showing an example of a document to which a document ID is recorded using characters shown in FIG. 9(a).

FIG. 13 is a drawing showing one example of a table which is held by a document ID database of the document recognition apparatus of the document recognition system as one embodiment of the present invention.

FIG. 14 is a drawing showing one example of a table which is held by a document ID database of the document recognition apparatus of the document recognition system as one embodiment of the present invention.

FIG. 21(a) is a drawing showing the document ID of recognition object, and FIG. 21(b) is a drawing showing results of recognition.

FIG. 22(a) is a drawing showing the document ID of recognition object, and FIG. 22(b) is a drawing showing results of recognition.

FIGS. 23(a) to 23(c) are drawings each explaining one example of correction processing of the document ID by a correction unit of the document recognition apparatus of the document recognition system as one embodiment of the present invention, where FIG. 23(a) is a drawing showing the document ID of correction object, FIG. 23(b) is a drawing showing calculation for correction processing, and FIG. 23(c) is a drawing showing results of correction.

FIGS. 24(a) to 24(c) are drawings each showing one example of correction processing of the document ID by the correction unit of the document recognition apparatus of the document recognition system as one embodiment of the present invention, where FIG. 24(a) is a drawing showing the document ID of correction object, FIG. 24(b) is a drawing showing calculation for correction processing, and FIG. 24(c) is a drawing showing results of correction.

FIGS. 25(a) to 25(c) are drawings each explaining one example of correction processing of the document ID by the correction unit of the document recognition apparatus of the document recognition system as one embodiment of the present invention, where FIG. 25(a) is a drawing showing the document ID of correction object, FIG. 25(b) is a drawing showing calculation for correction processing, and FIG. 25(c) is a drawing showing results of correction.

FIG. 26(a) is a drawing showing the document ID of content confirmation object and FIG. 26(b) is a drawing showing results of content confirmation.

FIG. 27(a) is a drawing showing the document ID of content confirmation object and FIG. 27(b) is a drawing showing results of content confirmation.

FIG. 28(a) is a drawing showing the document ID of content confirmation object and FIG. 28(b) is a drawing showing results of content confirmation.

FIG. 29(a) is a drawing showing the document ID of content confirmation object and FIG. 29(b) is a drawing showing results of content confirmation.

FIG. 32(a) and FIG. 32(b) are drawings each explaining a judgment example by a judgment unit of the document recognition apparatus of the document recognition system as one embodiment of the present invention, where FIG. 32(a) is a drawing showing a judgment object document, and FIG. 32(b) is a drawing showing results of recognition by the recognition unit of the document shown in FIG. 32(a).

FIG. 33(a) and FIG. 33(b) are drawings each explaining a judgment example by the judgment unit of the document recognition apparatus of the document recognition system as one embodiment of the present invention, where FIG. 33(a) is a drawing showing a judgment object document, and FIG. 33(b) is a drawing showing results of recognition by the recognition unit of the document shown in FIG. 32(a).

FIG. 35(a) is a drawing showing a detection object document and FIG. 35(b) is a drawing showing results of detection.

FIG. 36(a) is a drawing showing a detection object document and FIG. 36(b) is a drawing showing results of detection.

FIG. 37(a) is a drawing showing a detection object document and FIG. 37(b) is a drawing showing results of detection.

FIG. 38(a) is a drawing showing a detection object document, FIG. 38(b) is a drawing showing results of detection for a predetermined area containing a first document ID of the document shown in FIG. 38(a), FIG. 38(c) is a drawing showing results of detection for a predetermined area containing a second document ID of the document shown in FIG. 38(a), and FIG. 38(d) is a drawing showing results of detection for a predetermined area containing a third document ID of the document shown in FIG. 38(a), and FIG. 38(e) is a drawing showing results of detection for a predetermined area containing a fourth document ID of the document shown in FIG. 38(a).

FIG. 41(a) is a drawing showing a processing object document, FIG. 41(b) is a drawing showing results of recognition by the recognition unit, and FIG. 41(c) is a drawing explaining correction processing by a mutual correction unit of a confirmation unit.

FIGS. 42(a) to 42(c) are drawings each explaining one example of correction processing by the correction unit of the document recognition apparatus as a variation of the present invention, where FIG. 42(a) is a drawing showing a recognition object document, FIG. 42(b) is a drawing showing results of recognition by the recognition unit, and FIG. 42(c) is a drawing explaining correction processing by the correction unit.

FIG. 43(a) is a drawing showing results of recognition by the recognition unit of the document ID that is correction target, FIG. 43(b) is a drawing showing one example of a table held by the document information database.

FIGS. 44(a) to 44(e) are drawings each explaining one example of correction processing by the mutual correction unit of the document recognition apparatus as a variation of the present invention, where FIG. 44(a) is a drawing showing a processing object document, FIG. 44(b) is a drawing showing results of recognition by the recognition unit, and FIG. 44(c) and FIG. 44(d) are drawings each showing results of recognition including coincidence degree calculated by the recognition unit, and FIG. 44(e) is a drawing showing a table related to coincidence degree calculated by the recognition unit being retained in advance.

DESCRIPTION OF THE PREFERRED EMBODIMETS

Figure 1:
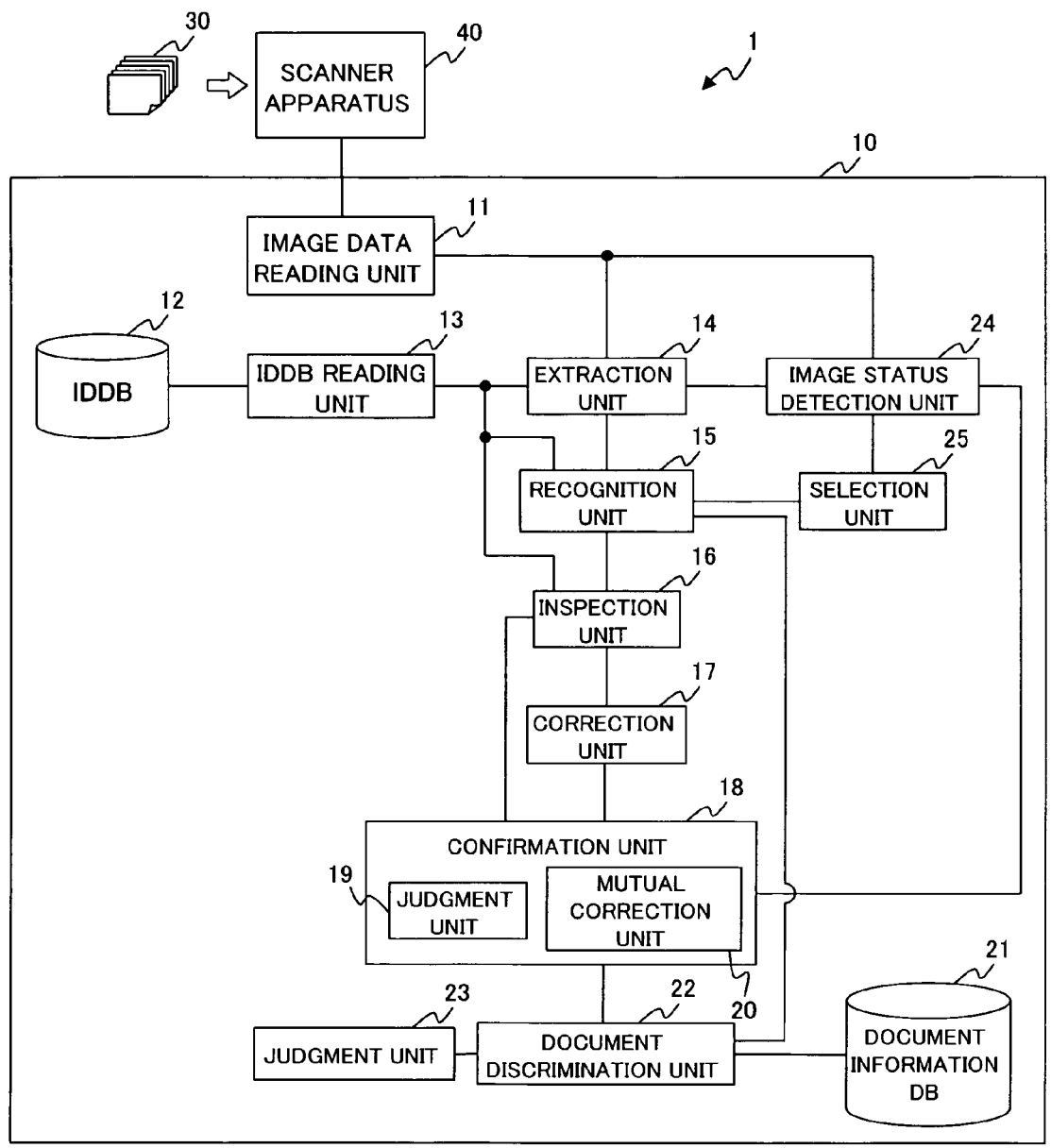
FIG. 1 is a block diagram showing composition of a document recognition system as one embodiment of the present invention.

Referring now to the drawings, embodiments of the present invention will be described.

[1] One Embodiment of the Present Invention

[1-1] Composition of Medium Processing System

First, referring to the block diagram shown in FIG. 1, composition of a document recognition system (medium processing system) 1 as one embodiment of the present invention will be described. As shown in FIG. 1, the document recognition system 1 is a recognition (processing) object and includes a plurality of documents (media) 30 on which a plurality of information items satisfying a predetermined relationship [characters, symbols, numeric characters pictures, barcode or the like (hereinafter referred collectively to as characters)] is recorded at a plurality of areas, a scanner apparatus 40 for obtaining image data of the document 30 by reading each of a plurality of documents 30, and a document recognition apparatus (medium processing apparatus) 10 for recognizing the information recorded (indicated) in the document 30 based on the image data obtained by the scanner apparatus 40.

In the following description, composition of each of the medium 30, the scanner apparatus 40, and the document recognition apparatus 10 will be described.

[1-2] About Document

Figures 2, 3:
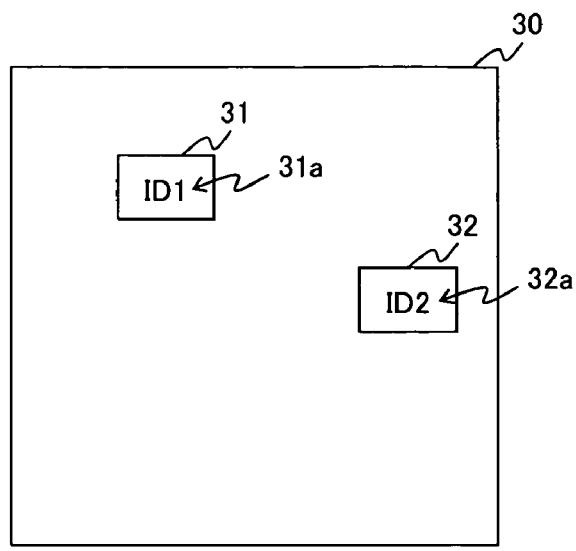
FIG. 2 is a drawing showing one example of a document of the document recognition system as one embodiment of the present invention.
FIG. 3 is a drawing explaining a relationship between a first document ID and a second document ID of the document shown in FIG. 2.

First, the document 30 in the document recognition system 1 is explained. As shown in FIG. 2, in the document 30, a first document ID31a (expressed as "ID1" in the drawing) as information items is recorded (indicated) in an area 31 and a second document ID32a (expressed as "ID2" in the drawing) as information items is recorded in an area 32.

The first document ID31a (hereinafter also referred to as document ID31a) and the second document ID32a (hereinafter also referred to as document ID32a) are being set so as to satisfy a predetermined relationship (mutual relationship or coverage relationship) which is described later.

[1-2-1] About the Predetermined Relationship Between the First Document ID and the Second Document ID The predetermined relationship between the first document ID31a and the second document ID32a of the document 30 is explained by giving an embodiment. For example, between the document ID31a and the document ID 32a, a relationship that these two are identical is set, or that a sum of the document ID31a and the document ID32a is constant, as shown in FIG. 3, is set.

According to the relationship shown in FIG. 3, both the document ID31a and the document ID 32a are composed of numeric characters of more than 100 with three digits, and the document ID31a and the document ID32a satisfy a relationship that a sum of each may become always "1000".

As another example, in some cases, each of characters constituting the document ID31a and each of characters constituting the document ID32a are set so as to have one-on-one correspondence relationship each other, but each still composed of different characters.

That is, as shown in FIG. 4, when the document ID31a and 32a are composed of numeric characters, for example, numeric characters in the document ID32a are set by different numeric characters having one-on-one correspondence relationship against each of numeric characters 0 to 9 in the document ID31a. In this example, each of "0", "1", "2", "3", "4", "5", "6", "7", "8", "9" in the document ID31a corresponds to "5", "8", "9", "6", "7", "0", "3", "4", "1", "2" in the document ID32a, respectively.

In other words, numeric characters constituting the document ID31a and 32a are being set so that between the document ID31a and the document ID32a, "0" and "5" show one-on-one correspondence each other, "1" and "8" show one-on-one correspondence each other, "2" and "9" show one-on-one correspondence each other, "3" and "6" show one-on-one correspondence each other, and "4" and "7" show one-on-one correspondence each other.

Therefore, as shown in FIG. 5, when the document ID31a and 32a are of three digits numeric characters and the document ID31a is in a range of 100 to 500, and when, for example, the document ID31a is "100", the document ID32a becomes "855", when the document ID31a is "237", the document ID32a becomes "964", and when the document ID31a is "500", the document ID32a becomes "055". In this way, based on the correspondence relationship shown in FIG. 4, the document ID31a and the document ID32a are set by different numeric characters so that both may have one-on-one coverage relationship each other.

Meanwhile, one-on-one correspondence relationship shown in FIG. 4 is preferably determined based on recognition rate by the document recognition apparatus 10 (specifically, the recognition unit 15 described later) for each of numeric characters.

Figures 6A, 6B:
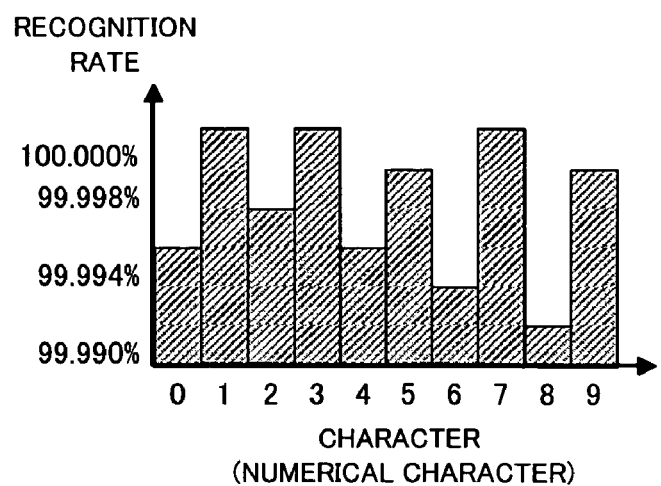
FIG. 6(a) and FIG. 6(b) are drawings each explaining characters constituting the first document ID and the second document ID of the document shown in FIG. 2, where

Namely, as shown in FIG. 6(a), recognition rate which is the rate of correct recognition of a character, of characters (numeric characters 0 to 9 in this example) is different in the document recognition apparatus 10.

Therefore, in one-on-one correspondence relationship shown in FIG. 4, it is preferable to set, based on recognition rate of each of numeric characters 0 to 9 by the document recognition apparatus 10 shown in FIG. 6(a) highest recognition rate "1" and lowest "8" correspond each other, second place "3" and ninth place "6", third place "7" and eighth place "4", fourth place "5" and seventh place "0", and fifth place "9" and sixth place "2" correspond each other, and that a total of recognition rate of a pair of numeric characters showing aforementioned one-on-one correspondence may become even as much as possible.

With this consideration, variations of recognition rate of numeric characters constituting the document ID 31a and 32a can be reduced and the document recognition apparatus 10 can execute character recognition with stable recognition rate regardless of characters constituting the document ID 31a and 32a.

Further, when the document ID31a and the document ID 32a of the document 30 are set so as to satisfy one-on-one correspondence relationship as shown in FIG. 4, recognition rate by the document recognition apparatus 10 can be improved compared with a case where the document ID31a and the document ID32a are simply made identical.

Namely, as shown in FIG. 7, for example, when the document ID31a is "8888" and the document ID32a is also "8888" (case 1), and when the document ID31a is "8888" and the document ID32a is "1111" that is being set based on the coverage relationship of above-mentioned FIG. 4 (case 2), and if these two are compared, and recognition rate of "8" by the document recognition apparatus 10 is 99.99% and recognition rate of "1" by the document recognition apparatus 10 is 99.999%, recognition rate of the document ID31a and 32a in case 1 is respectively biquadrate of 99.99%, combined recognition rate (document discrimination rate) of the document ID31a and the document ID32a can be represented by "(99.99%×99.99%)^4", and therefore, document discrimination impossible rate (namely, possibility that these document ID31a and 32a can not be recognized) becomes "0.08%".

In contrast, in case 2, recognition rate of the document ID31a is biquadrate of 99.99%, and recognition rate of the document ID32a becomes biquadrate of 99.999%. Therefore, recognition rate of these documents ID31a and 32a can be represented by "(99.99%×99.99%)^4", and document discrimination impossible rate becomes "0.044%".

In this way, there is a difference of 0.036% in document discrimination impossible rate between case 1 and case 2, and improvement of the recognition rate is more remarkable in case 2 where the document ID31a and 32a are being set so as to satisfy the coverage relationship shown in FIG. 4 than case 1 where the document ID31a and 32a are simply identical.

[1-2-2] Characters Constituting First Document ID and Second Document ID

Figure 8A:
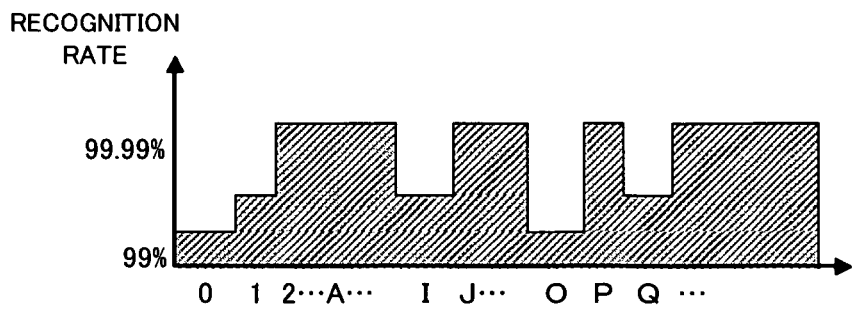
FIGS. 8(a) to 8(d) are drawings each explaining one example of characters constituting a document ID to be recorded in a document of the document recognition system as one embodiment of the present invention, where

Next, characters constituting each of the documents ID31a and 32a will be explained. As shown in FIG. 8(a), when numeric characters and alphabetical characters (capital letters in this case) are used as the character constituting each of the document ID31a and 32a, characters with recognition rate below a predetermined level based on the recognition rate of each character are not used as characters constituting the document ID31a and 32a.

Figure 8B:
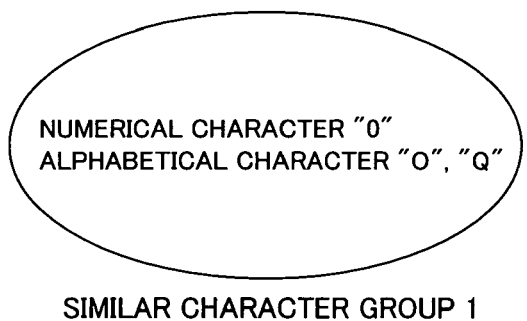

Besides, as shown in FIG. 8(b), when numeric characters and alphabetical characters are used, since "0" as a numeric character and "O" and "Q" as alphabetical characters are very analogous, it is difficult for the document recognition apparatus 10 to recognize these similar characters (shown as "Similar character group 1" in the drawing) with clear discrimination.

Figure 8C:
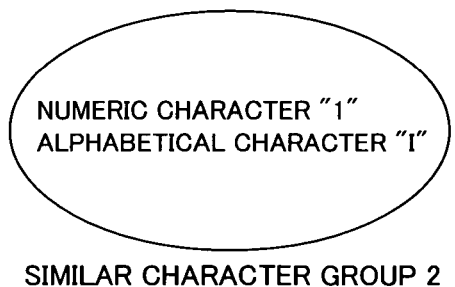

Further, as shown in FIG. 8(c), "1" as a numeric character and "I" as an alphabetical character also appear to be similar characters (shown as "Similar character group 2" in the drawing) to the document recognition apparatus 10.

Figure 8D:
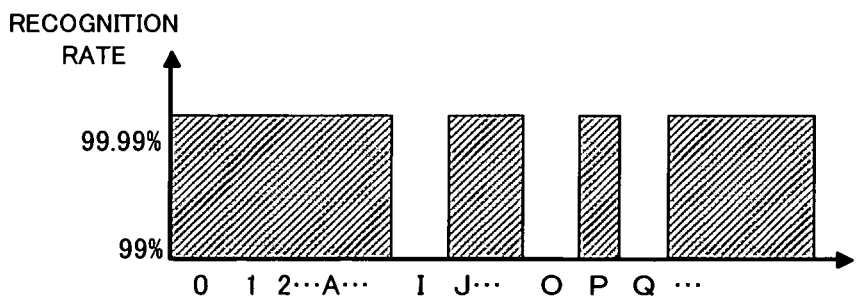

Therefore, it is determined that for these similar characters, one character may be used in each of groups. For example, as shown in FIG. 8(d), numeric characters should be used on a priority basis in such that in similar character group 1, alphabetical characters "O" and "Q" are excluded from characters constituting the document ID31a and 32a. Moreover, an alphabetical character "I" is excluded in the similar character group 2.

In this way, when characters constituting the document ID31a and 32a are limited to those having a predetermined recognition rate, recognition rate of the document recognition apparatus 10 for the document ID31a and 32a can be increased, and the document recognition apparatus 10 can recognize the document 30 with higher accuracy.

Moreover, when characters of a plurality of types are used as characters constituting the document ID31a and 32a, for characters which the document recognition apparatus 10 finds to be difficult to discriminate, only one character in the similar character group is used as the character constituting the document ID31a and 32a, thereby increasing recognition rate of the document recognition apparatus 10.

Figure 9A:
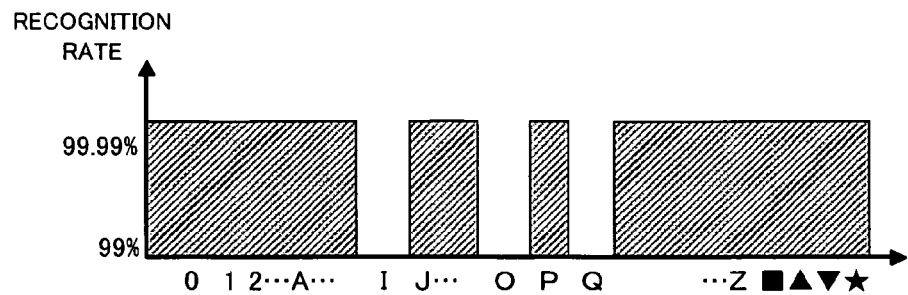
FIGS. 9(a) to 9(e) are drawings each showing one example of characters constituting the document ID to be recorded in the document of the document recognition system as one embodiment of the present invention, where
Figure 9B:
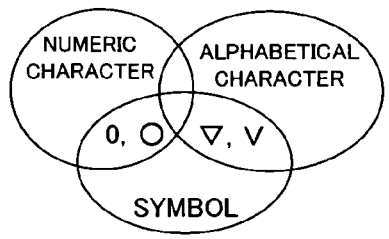
Figure 9C:
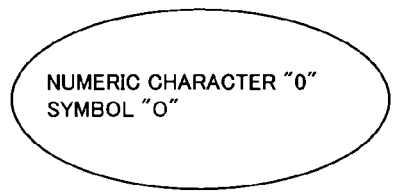
Figure 9D:
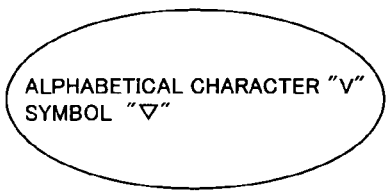
Figure 9E:
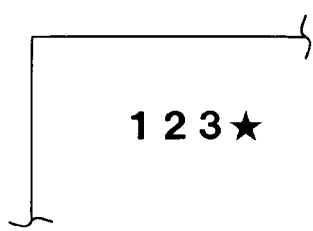

Furthermore, although a case where characters of two types (numerical character and alphabetical character) are used is explained in FIGS. 8(a) to 8(d), the document 31a and 32a may be composed of more than three types (numeric character, alphabetical character and symbol in this case) may be used as shown in FIGS. 9(a) to 9(e). In this case, similar character appears between each of three types and among all of three types as shown in FIG. 9(b), while if only one character in the similar character group, as shown in FIG. 9(c) and FIG. 9(d), is used as a character constituting the document ID31a and 32a (see FIG. 9(a) ), high accuracy character recognition can be realized by the document recognition apparatus 10.

Meanwhile, FIG. 9 (e) shows an example of a document ID31a composed of a combination of numeric characters and symbols.

[1-2-3] Variation of Documents

Figure 10:
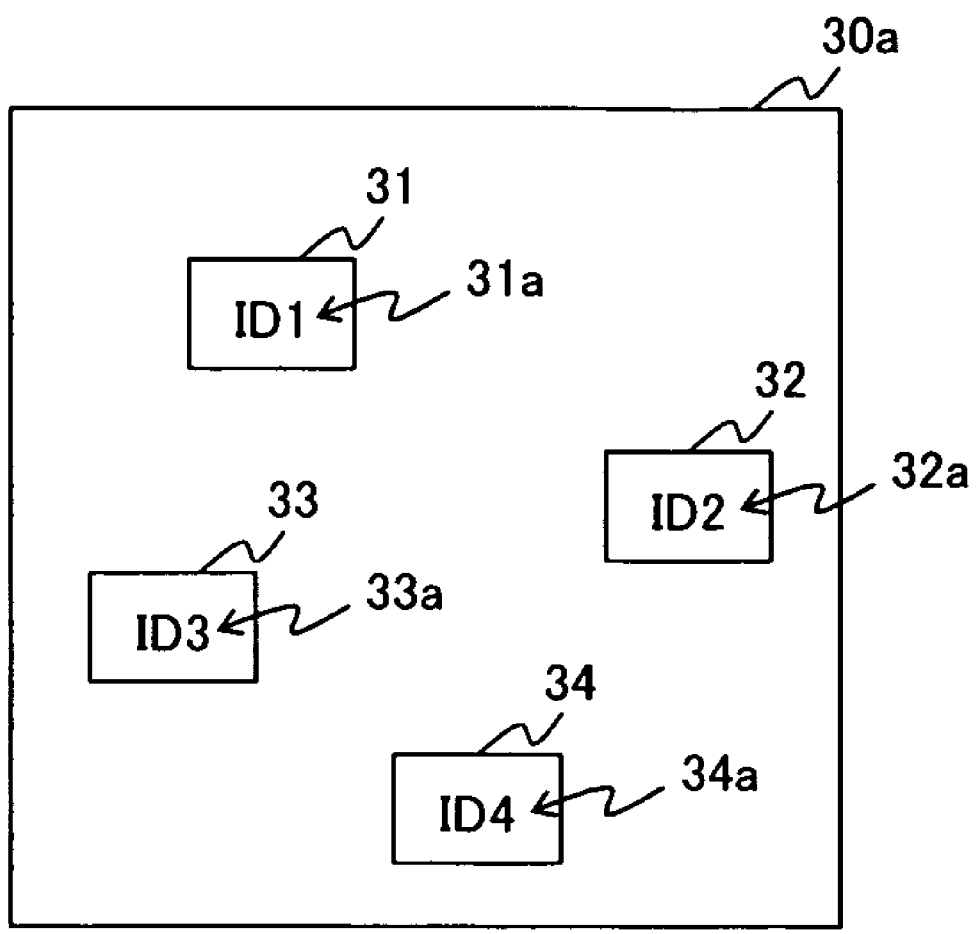
FIG. 10 is a drawing showing one example of the document of the document recognition system as one embodiment of the present invention.

As a variation of a document in this document recognition system 1 as shown in FIG. 10, the document 30a may be include a document 33a (expressed as "ID3" in the drawing) and a document 34a (expressed as "ID4" in the drawing) in areas 33 and 34 to have not less than three (four in this case) documents ID31a to 34a in addition to the document ID31a and 32a.

[1-3] About Scanner Apparatus

Next, explanation will be given for the scanner apparatus 40 of the document recognition system 1, wherein the scanner apparatus 40 is for reading optically a medium (document 30 in this case) as an image data.

Figure 11:
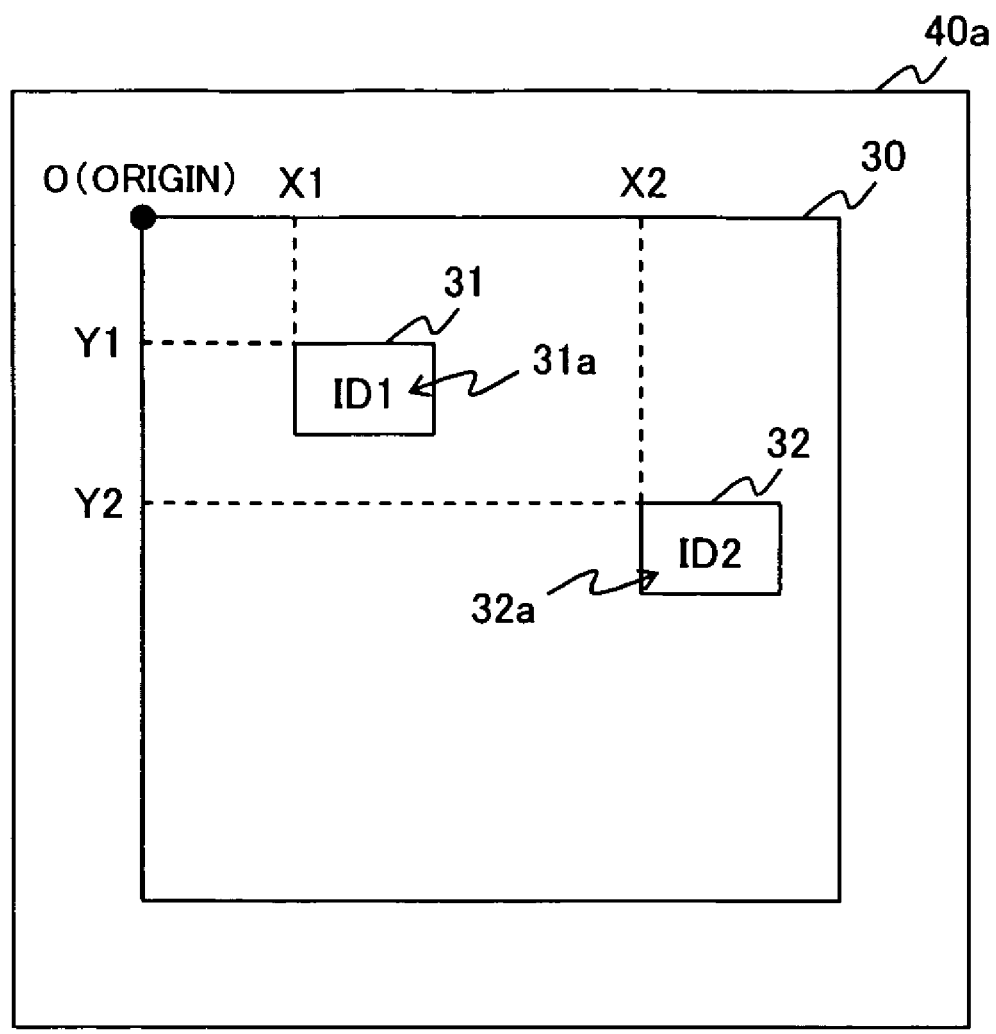
FIG. 11 is a drawing showing an image data of a medium shown in FIG. 2 read by a scanner apparatus of the document recognition system as one embodiment of the present invention.

In FIG. 11, an image data 40a obtained by reading the document 30 shown in FIG. 2 by the scanner apparatus 40 is shown. As explained previously referring to FIG. 2, the document 30 has the area 31 in which is recorded a first document ID31a (expressed as "ID1" in the drawing) and the area 32 in which is recorded a second document ID32a (expressed as "ID2" in the drawing).

[1-4] About Composition of Document Recognition Apparatus

Next, explanation will be given for composition of the document recognition apparatus 10 of the present invention in the document recognition system 1, wherein as shown in FIG. 1, the document recognition apparatus 10 includes an image data reading unit 11, an ID database (IDDB) 12, an IDDB reading unit 13, an extraction unit 14, a recognition unit 15, an inspection unit 16, a correction unit 17, a confirmation unit 18, a document information database (document information DB) 21, a document discrimination unit (medium discrimination unit) 22, a judgment unit 23, an image status detection unit 24, and a selection unit 25.

Figure 12:
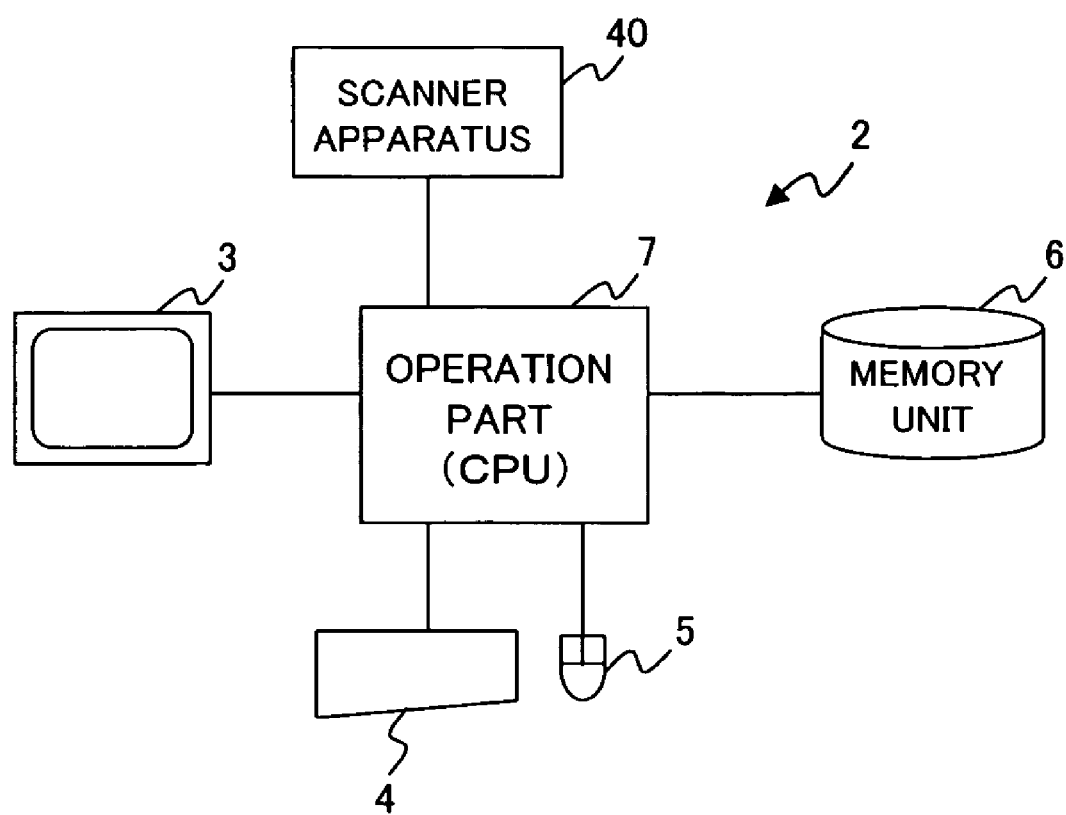
FIG. 12 is a drawing showing an example of composition of a computer by which is realized the document recognition apparatus of the document recognition system as one embodiment of the present invention.

Meanwhile, the document recognition apparatus 10 is realized by, for example, an operation unit 7 (e.g., CPU: Central Processing Unit) of a computer 2 including a display unit 3, a keyboard 4 and a mouse 5 as an input interface, and a memory unit 6 as shown in FIG. 12.

That is, the image data reading unit 11, the IDDB reading unit 13, the extraction unit 14, the recognition unit 15, the inspection unit 16, the correction unit 17, the confirmation unit 18, the document discrimination unit 22, the judgment unit 23, the image status detection unit 24, and the selection unit 25 of the document recognition apparatus 10 are realized while the scanner apparatus 40 of the document recognition system 1 is connected to the operation unit 7 and the operation unit 7 executes a predetermined application program (e.g., medium processing program described later).

In the following explanation, unless otherwise specifically stated, explanation will be given referring to a case where the document recognition apparatus 10 recognizes the document 30 shown in FIG. 2 (namely, the image data 40a shown in FIG. 11).

The image data reading unit 11 is for reading the image data 40a obtained by reading the document 30 by the scanner apparatus 40.

The IDDB12 is a database to maintain a table that shows correspondence between type of a document and information relating to document ID in the document and for example, as information relating to a first document ID31a and a second document ID32a in the document 30, the following information (1) to (6) are maintained:

(1) Coordinates of an origin (left upper end in the area in this case) of each of area 31 and 32 in the document 30. Namely, coordinates (X1, Y1) and (X2, Y2) in FIG. 11.

(2) Number of digits (number of characters) of each of the first document ID31a and the second document ID32a.

(3) Location of check digit at each of the first document ID31a and the second document ID32a.

(4) Type of characters of each of the first document ID31a and the second document ID32a.

(5) Size of each of areas 31 and 32.

(6) Clear area (margin portion) in a search template for the extraction unit 14 to extract areas 31 and 32.

Figure 15:
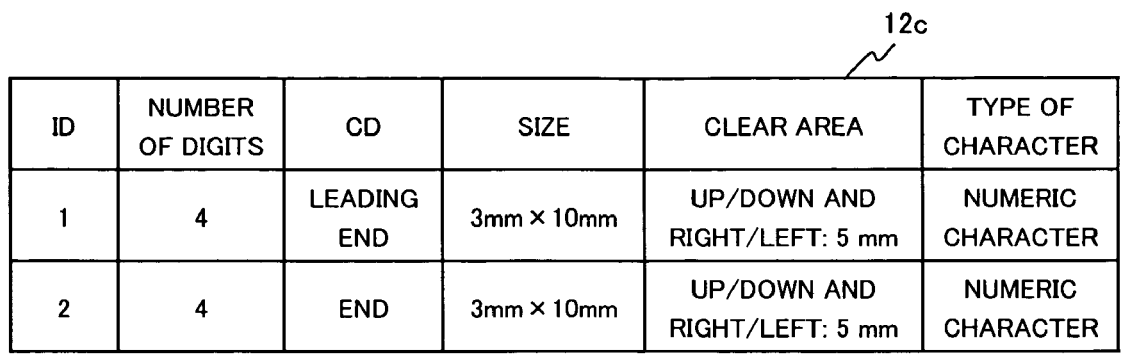
FIG. 15 is a drawing showing one example of a table held by a document ID database of the document recognition apparatus of the document recognition system as one embodiment of the present invention.

Here, examples of composition of a table maintained by the IDDB 12 are shown in FIGS. 13 to 15. First, in a first example shown in FIG. 13, a table 12a maintained by the IDDB 12 targets the document 30 shown in FIG. 11 as a processing object and maintains information of above-mentioned items (1) to (4). In the table 12a, "1" of "ID" item denotes a first document ID31a and "2" denotes a second document ID32a.

As shown in FIG. 11, the table 12a maintains, as the information of above (1), origin coordinates (X1, Y1) of the area 31 and origin coordinates (X2, Y2) of the area 32.

Further, the table 12a maintains, as the information of above (2), number of digits "4" of each of the first document ID31a and the second document ID32a.

Furthermore, the table 12a maintains, as the information of above (3), location of check digit of the first document ID31a "Leading End" (represented by "CD" in the drawing) and location of check digit of the second document ID32a "End". Here, "Leading End" denotes left end of the document ID31a and 32a, and "End" denotes right end of the document ID31a and 32a.

Last, the table 12a maintains, as the information of above (4), type of character "numeric character" of each of the first document ID31a and the second document ID32a.

Besides, explanation will be given about a table 12b as a second example shown in FIG. 14, in which example the document recognition apparatus 10 targets documents of a plurality of types as the recognition object, and the table 12b maintains the same content of the table 12a shown in FIG. 13 for every type of document ("Type 01" and "Type 02" in this example). In the table 12b, origin coordinates of the first document ID of the document of "Type 01" is (X11, Y11), and origin coordinates of the second document ID is (X12, Y12) and similarly, origin coordinates of the first document ID of the document of "Type 02" is (X21, Y21), and origin coordinates of the second document ID is (X22, Y22). Further, the first document ID and the second document ID of a document of "Type 02" have number of digits "6" and type of characters "alphabetical characters".

Further, explanation will be given about a table 12c as a third example shown in FIG. 15, in which example the table 12c maintains information mainly necessary for the extraction unit 14 to extract from the document 30 a document ID (i.e., area 31 and 32) and maintains the information of above (2) to (6).

Here, the information of above (2) to (4) are same as those of the table 12a. In the table 12c, likewise the table 12a, "1" of "ID" item denotes the first document ID31a and "2" denotes the second document ID32a.

The table 12c maintains, as the information of above (5), dimensions representing a size of each of area 31 and 32 (area 31 and 32 are rectangular and hence height and lateral width here) "3 mm×10 mm" for each of documents ID31a and 32a.

Figure 17:
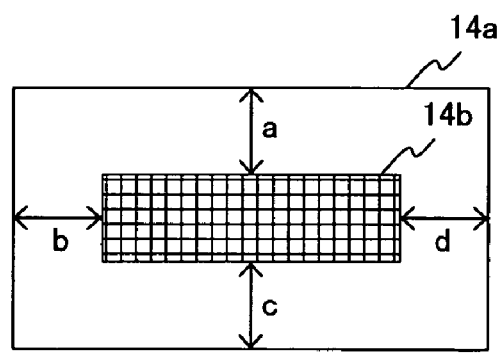
FIG. 17 is a drawing showing one example of a search template used when a document ID is extracted by the extraction unit of the document recognition apparatus of the document recognition system as one embodiment of the present invention.
Figure 18:
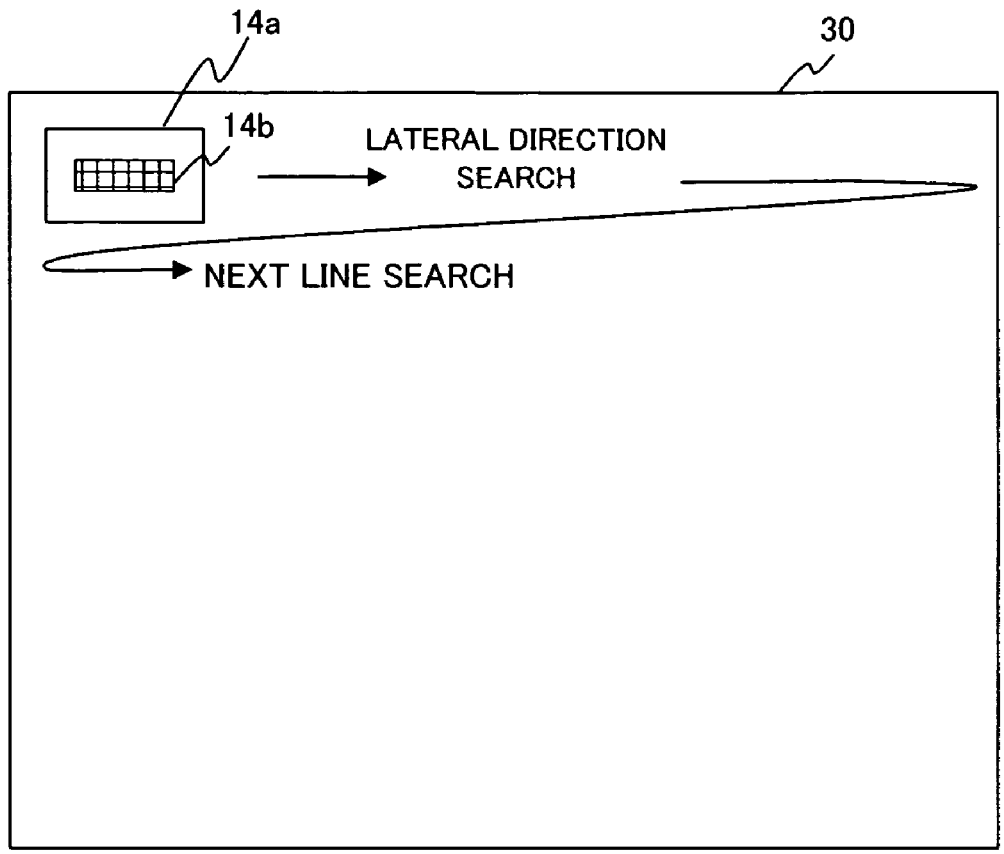
FIG. 18 is a drawing explaining search processing using the search template shown in FIG. 17 by the extraction unit of the document recognition apparatus of the document recognition system as one embodiment of the present invention.

Further, the table 12c maintains, as the information of above (6), a clear area (simply expressed as "clear area" in the drawing) "Right and left, up and down: 5 mm" in a search template (see FIG. 17 described later) used by the extraction unit 14 for extracting area 31 and 32 in each of documents ID31a and 32a.

The IDDB reading unit 13 is for reading information necessary for the extraction unit 14 to extract from the IDDB 12 (e.g., from any of tables 12a to 12c) the document ID31a and 32a.

The extraction unit 14 extracts each of the document ID31a and 32a from an image data 40a of the document 30 being read by the image data reading unit 11, based on the information read by the IDDB reading unit 13.

Specifically, the extraction unit 14 executes searching on the image data 40a by using a search template 14a (see FIG. 17 described later) based on at least one of information items of above-mentioned (1), (5), (6) obtained by the IDDB reading unit 13.

Here, explanation will be given referring to FIGS. 16 to 19 for a case where the extraction unit 14 extracts an area 31 based on above-mentioned information (5) and (6) shown in the table 12c.

Figure 16:
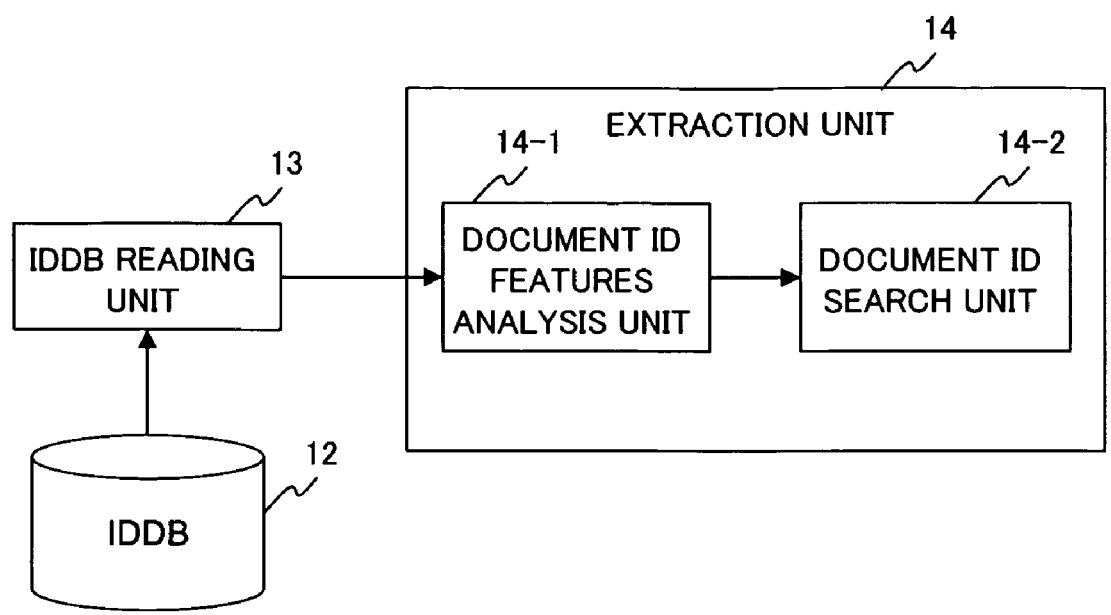
FIG. 16 is a drawing explaining composition of an extraction unit of the document recognition apparatus of the document recognition system as one embodiment of the present invention.

As shown in FIG. 16, the extraction unit 14 includes a document ID features analysis unit 14-1 and a document ID search unit 14-2, wherein the document ID features analysis unit 14-1 analyzes information of the table 12c in the IDDB 12 being read by the IDDB reading unit 13. Particularly, the document ID features analysis unit determines a search template 14a shown in FIG. 17 based on the size ("3 mm×10 mm") of the area 31 and 32 as the information of above-mentioned (5) in the table 12c and on the clear area ["Up (upper side) and down (down side), right (right side) and left (left side): 5 mm"] as the information of above-mentioned (6).

That is, the document features analysis unit 14-1 of the document 14 generates a shaded area 14b in rectangular form having a size of "3 mm×10 mm" same as the area 31 and 32 and a search template 14a in rectangular form spaced perpendicularly by 5 mm from each side of this area 14b (see both direction arrows a to d).

Then the document ID search unit 14-2 of the extraction unit 14 executes lateral direction search using the search template 14a on the document 30 in the image data 40a. With this lateral direction search, search is initiated by moving the search template 14a from the left upper end of the document 30 in right direction, when reached the right end of the document 30, the search template 14a is moved downwardly by a predetermined distance, and is moved from the left end in the right direction to continue search. The document ID search unit 14-2 executes this search processing until the document ID31a and 32a (only document ID31a in this case) are extracted.

Figure 19:
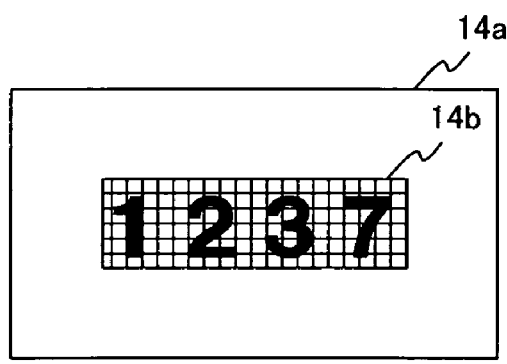
FIG. 19 is a drawing showing a search template when a document ID is searched by the search template shown in FIG. 17 by the extraction unit of the document recognition apparatus of the document recognition system as one embodiment of the present invention.

For example, when the first document ID31a is "1237", if the area 31, where "1237" is clearly indicated inside of the shaded area 14b of the search template 14a (i.e., the shaded area 14b and the area 31 coincide each other) as shown in FIG. 19, the extraction unit 14 extracts the document ID31a (area 31) thereby completing the processing.

According to the processing using this search template 14a, the extraction unit 14 can extract the area 31 and 32 from the document 30 of the image data 40a without above-mentioned information (1).

Further, explanation will be given for embodiment other than the method of extraction of the document ID31a and 32a of the area 31 and 32 using the search template 14a by the extraction unit 14, in which case the extraction unit 14 can extract the document ID31a and 32a of the area 31 and 32 using above-mentioned information (1) and (2).

That is, the extraction unit 14, for example, extracts the document ID31a and 32a recorded the area 31 and 32 directly from the image data 40a using coordinates of the origin of the area 31 and 32 maintained in the table 12a and 12b and the number of characters of the document ID31a and 32a.

The recognition unit 15 recognizes content (i.e. characters) of each of the first document ID31a of the area 31 and the second document ID32a of the area 32 extracted by the extraction unit 14 and executes character recognition using above-mentioned information (2) and (4) being read by the IDDB reading unit 13.

That is, the recognition unit 15 calculates coincidence degree (certainty degree) with a plurality of candidate characters for every character of each of document ID31a and 32a, and the candidate character with the highest incidence degree calculated is recognized as one character of each of documents ID31a and 32a.

Here, details of character recognition processing by the recognition unit 15 for the document ID31a will be explained referring to an example where the document ID31a in the area 31 extracted by the extraction unit 14 is "1237".

Figure 20:
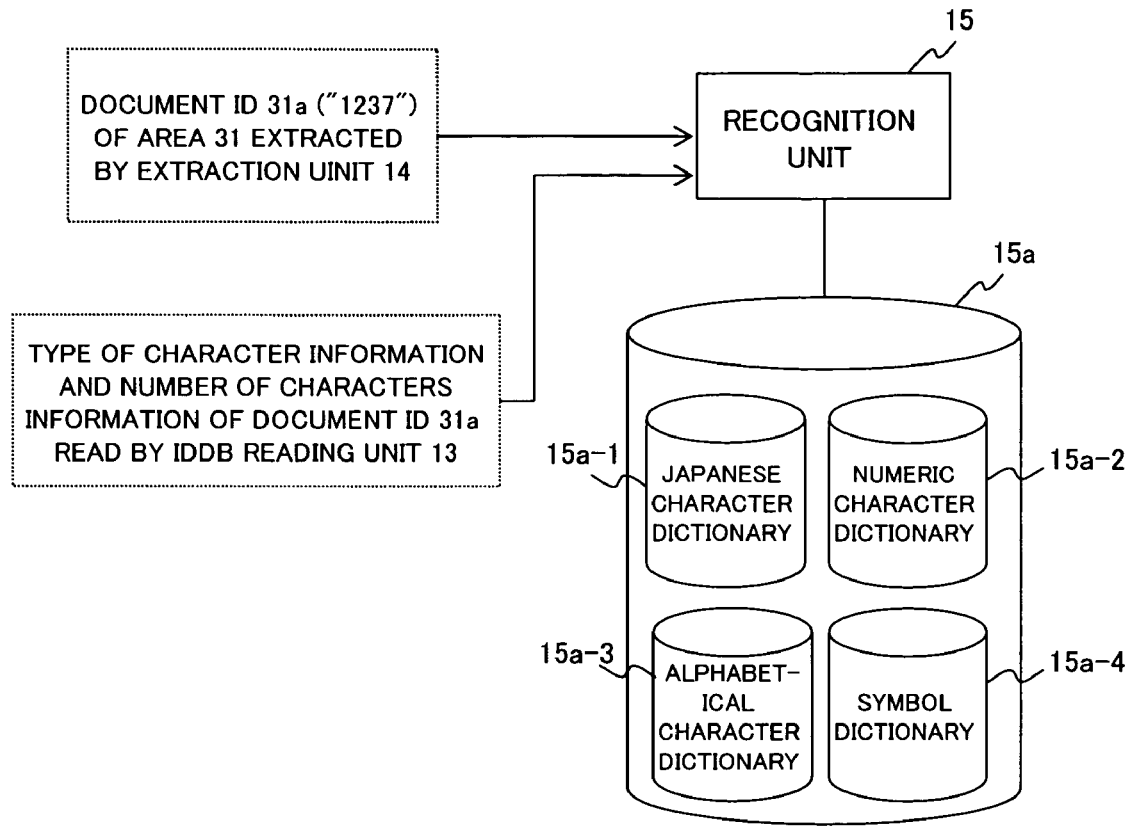
FIG. 20 is a drawing explaining character recognition processing by a recognition unit of the document recognition apparatus of the document recognition system as one embodiment of the present invention.

That is, as shown in FIG. 20, the recognition unit 15 is connected to a character dictionary 15a including a Japanese character dictionary 15a-1, a numeric character dictionary 15a-2, an alphabetical character dictionary 15a-3, and a symbol dictionary 15a-4, and when the document ID31a extracted by the extraction unit 14 is "1237", the recognition unit 15 recognizes that the document ID31a is a numeric character based on the above-mentioned information (4) (type of character information) read by the IDDB reading unit 13, and executes character recognition using the numeric character dictionary 15a-2 in the character dictionary 15a.

Further, the recognition unit 15 recognizes that the document ID31a has four characters based on the above-mentioned information (2) (number of characters information) read by the IDDB reading unit 13 and executes character recognition.

Then, the recognition unit 15 calculates coincidence degree with regard to candidate characters based on the numeric character dictionary 15a-2 for every character of the document ID31a extracted by the extraction-unit 14, and adopts the candidate character with the highest first place incidence degree calculated as the character constituting the document ID31a. This job is carried out for every four characters in this example and the recognition unit 15 recognizes the document ID31a to be "1237".

Figures 21A, 21B:
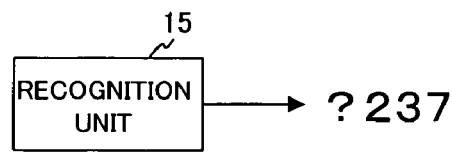
FIG. 21(a) and FIG. 21(b) are drawings each explaining one example of recognition processing of the document ID by the recognition unit of the document recognition apparatus of the document recognition system as one embodiment of the present invention, where

However, for example, when a graffiti (overwriting) such as X mark is attempted over numeric character "1" as the document ID31a in the document 30 as shown in FIG. 21(a), although the recognition unit 15 calculates coincidence degree with regard to candidate characters for overwritten "1", the graffiti results in an operational noise, the recognition unit 15 is unable to recognize correctly the document ID31a as shown in FIG. 21(b), and in some cases, numeric character "1" is rejected or can not be recognized as a character (shown by "?" in the drawing).

Here, that the recognition unit rejects, means such a case where the recognition unit is unable to identify recognition object character as one character, as is the case where there are a plurality of candidate characters having first place coincidence degree or a difference of coincidence degree between a first place candidate and a second place candidate is marginal.

Besides, a case where the recognition unit 15 is unable to identify the object as the character is such a case where coincidence degree of all the candidate characters is equal to or less than a predetermined value.

Figures 22A, 22B:
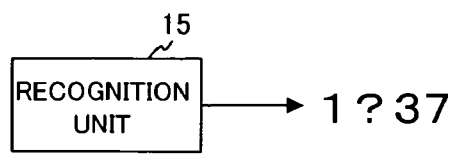
FIG. 22(a) and FIG. 22(b) are drawings each explaining one example of recognition processing of the document ID by the recognition unit of the document recognition apparatus of the document recognition system as one embodiment of the present invention, where

When, as shown in FIG. 22(a), numeric character "2" portion as the document ID31a is contaminated on the image data 40a read by the scanner apparatus 40 due to original contamination or wrinkles of the document 30, or contamination or wrinkles adhered when read by the scanner apparatus 40, this contamination results in an operational noise, and the recognition unit 15 is unable to recognize correctly numeric character "2" as shown in FIG. 22(b) (shown by "?" in the drawing).

The inspection unit 16 executes inspection using check digit for characters of each of the document ID31a and 32a recognized by the recognition unit 15.

That is, the inspection unit 16 extracts check digit from each of above-mentioned document ID31a and 32a using above-mentioned information (3) read by the IDDB reading unit 13 from the IDDB 12, and inspects based on the check digit thus extracted whether or not the document ID31a and 32a are recognized correctly by the recognition unit 15.

For example, when the document ID31a is recognized as "1247" by the recognition unit 15, location of check digit of the document ID31a is at "Leading end (left end)" as shown in the table 12a in FIG. 13, and hence the inspection unit 16 extracts "1" as the check digit based on this information.

The algorithm of check digit used here is such that in four-digit document ID, numerals representing last three digits ("247" in this case) is divided by the right end figure ("7" in this case) and the reminder of this division is subtracted from the right end figure, and this difference equals to the check digit.

The inspection unit 16 executes calculations of the following (A) and (B) based on the above-mentioned algorithm:

$$247/7 = 35 \ldots 2 \quad (A)$$

$$7 - 2 = 5 \quad (B)$$

The inspection unit 16 then judges whether or not result of above calculation (B) that is "5" and check digit "1" are identical and in this case, these two are not identical, and therefore, the inspection unit 16 judges that recognition "1247" of the document ID31a by the recognition unit 15 is incorrect.

When the document ID31a and 32a recognized by the recognition unit 15 is revealed to be incorrect by inspection by the inspection unit 16 using check digit, or character of either the document 31a or 32a is rejected or not recognized at character recognition by the recognition unit 15, the correction unit 17 either corrects content of the document ID31a and 32a using such check digit or corrects content of the document ID31a and 32a based on coincidence degree calculated by the recognition unit 15.

For example, as shown in FIG. 23(a), when check digit is rejected by the recognition unit 15 (expressed as "CD" in the drawing) (i.e., document ID is recognized as "?237"), the correction unit 17 executes calculations (C) and (D) shown in FIG. 23 (*b*) and considers the result of calculation (D) that is "1" as the rejected check digit. Namely, as shown in FIG. 23(*c*), document ID recognized by the recognition unit 15 is corrected to "1237".

Further, as shown in FIG. 24(*a*), when a character of third digit from the left end is rejected by the recognition unit 15 (i.e., document ID is recognized as "12?7"), the correction unit 17 executes calculations (E) and (F) shown in FIG. 24(*b*). Then, as shown in FIG. 24(*c*), the correction unit 17 corrects, as a result of calculation (F), character "?" rejected to "3" to correct the document ID recognized by the recognition unit 15 to "1237".

Further, as shown in FIG. 25(*a*), when a character of second digit from the left end is rejected by the recognition unit 15 (i.e., document ID is recognized as "1?37"), the correction unit 17 executes calculations (G) and (H) shown in FIG. 25(*b*). Then, as shown in FIG. 25(*c*), the correction unit 17 corrects rejected character "?" to "2" or "9" as a result of calculation (H).

Meanwhile, selection of either "2" or "9" mentioned above is performed based on coincidence degree for these "2", "9" in the recognition unit 15, and the correction unit 17 corrects the document ID using a numeric character with higher incidence degree calculated by the recognition unit 15.

The confirmation unit 18 confirms content (characters) of the document ID31*a* and 32*a* recognized by the recognition unit 15 and includes a judgment unit 19 and a mutual correction unit 20 as shown in FIG. 1.

The judgment unit 19 judges whether or not each of characters of the document ID31*a* and 32*a* recognized by the recognition unit 15, or each of characters of the document ID31*a* and 32*a* executed correction processing by the correction unit 17 is correct, based on the predetermined relationship set in advance between these document ID31*a* and 32*a*, that is explained referring to above shown FIG. 3 to FIGS. 6(*a*) and 6(*b*).

Meanwhile, the judgment unit 19 executes judgment processing regardless of results of the inspection by the inspection unit 16.

The mutual correction unit 20 confirms characters of the document ID31*a* and 32*a* as being recognized by the recognition unit 15 when the judgment unit 19 judges that character recognition by the recognition unit 15 is correct.

In the meantime, the mutual correction unit 20 corrects recognition content by the recognition unit 15 based on a predetermined relationship between the document ID31*a* and 32*a*, and confirms characters of the document ID31*a* and 32*a* when the judgment unit judges that character recognition by the recognition unit 15 is incorrect.

Here, specific example of operations of the confirmation unit 18 (judgment unit 19 and mutual correction unit 20) will be explained referring to FIGS. 26(*a*) and 26(*b*) to FIGS. 29(*a*) and 29(*b*). Embodiments shown in FIGS. 26(*a*) and 26(*b*) show a case where correction processing by the correction unit 17 is not executed while embodiments shown in FIGS. 27(*a*) and 27(*b*) to FIGS. 29(*a*) and 29(*b*) show a case where correction processing by the correction unit 17 is executed.

Figures 26A, 26B:
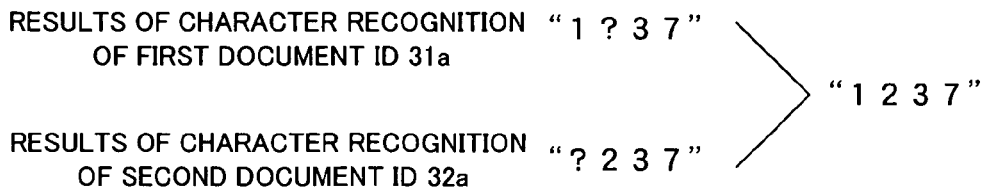
FIG. 26(a) and FIG. 26(b) are drawings each showing one example of processing for confirming content of the document ID by a confirmation unit of the document recognition apparatus of the document recognition system as one embodiment of the present invention, where

First, an example shown in FIGS. 26(*a*) and 26(*b*) is such that, as shown in FIG. 26(*a*), a second digit from the left end of the document ID31*a* is rejected (i.e., recognized as "1?37") and the left end of the document ID32*a* is rejected (i.e., recognized as "?237"). On this occasion, if a relationship that the document ID31*a* and 32*a* are identical is satisfied in the document 30, the judgment unit 19 judges that recognition content of the recognition unit 15 shown in FIG. 26(*a*) is incorrect.

Since digits each different have been rejected in the document ID31*a* and 32*a*, the mutual correction unit 20 then corrects and confirms the document ID31*a* and 32*a* to be "1237" as shown in FIG. 26(*b*), by correcting a numeric character of each digit by the numeric character not rejected in the document ID31*a* and 32*a*.

Figures 27A, 27B:
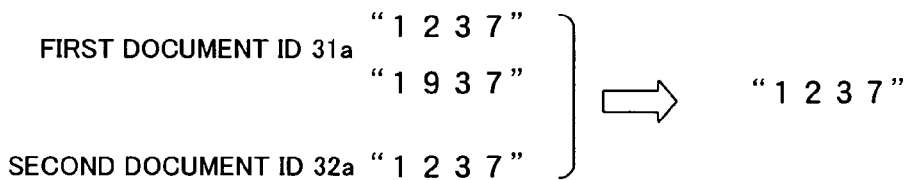
FIG. 27(a) and FIG. 27(b) are drawings each explaining one example of processing for confirming content of the document ID by the confirmation unit of the document recognition apparatus of the document recognition system as one embodiment of the present invention, where

Further, as shown in FIG. 27(*a*), when a plurality of document ID31*a* is calculated by the correction unit 17 (i.e., "1237" and "1937" are calculated), the judgment unit 19 judges that this recognition content is incorrect since there are a plurality of contents. When a relationship that the document ID31*a* and 32*a* are identical is satisfied in the document 30, the mutual correction unit 20 then confirms content of the document ID31*a* to be "1237" based on the result of recognition of the document ID32*a* (i.e., "1237") as shown in FIG. 27(*b*).

Figures 28A, 28B:
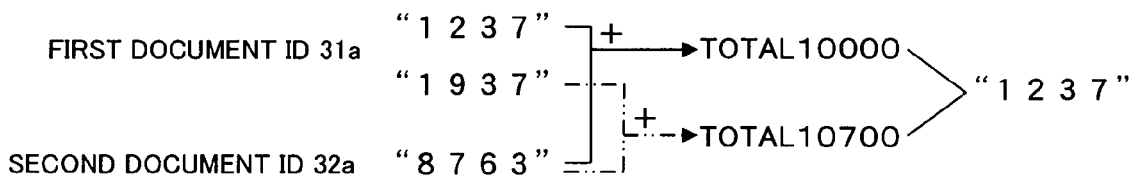
FIG. 28(a) and FIG. 28(b) are drawings each showing one example of processing for confirming content of the document ID by the confirmation unit of the document recognition apparatus of the document recognition system as one embodiment of the present invention, where

Further, as shown in FIG. 28(*a*), when a plurality of document ID31*a* is calculated by the correction unit 17 likewise FIG. 27(*a*), and a relationship that a total of each of the document ID31*a* and of 32*a* is respectively "10000" in the document 30 is satisfied, the mutual correction unit 20 totalizes a plurality of candidates of the document ID31*a* and the document ID32*a* "8763", and confirms the content "1237" that results in "10000" as the document ID31*a*, as shown in FIG. 28(*b*).

Figures 29A, 29B:
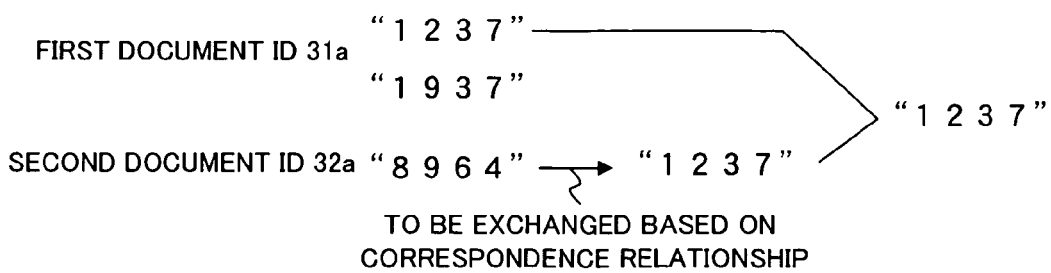
FIG. 29(a) and FIG. 29(b) are drawings each showing one example of processing for confirming content of the document ID by the confirmation unit of the document recognition apparatus of the document recognition system as one embodiment of the present invention, where

Further, as shown in FIG. 29(*a*), when a plurality of document ID31*a* is calculated by the correction unit 17 likewise FIG. 27(*a*), and the document ID31*a* and 32*a* are constituted by different characters in the document 30 so that the document ID31*a* and 32*a* satisfy one-on-one relationship shown in above-mentioned FIG. 4, the mutual correction unit 20 confirms "1237", that is obtained by converting each of document ID32*a* "8964" to other characters showing a correspondence relationship shown in FIG. 4, as the document ID31*a*, as shown in FIG. 29(*b*).

Figures 30, 31:
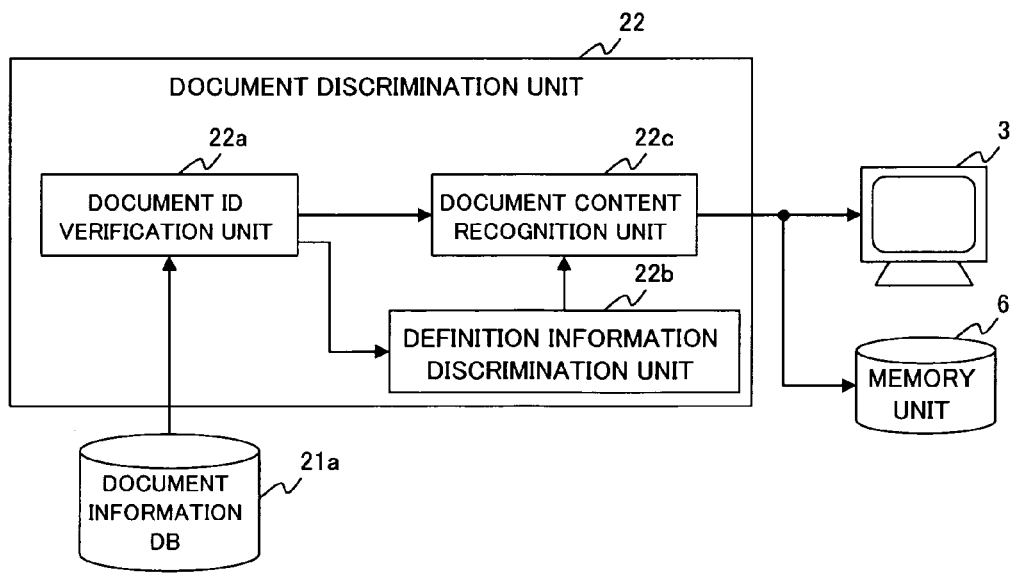
FIG. 30 is a drawing showing one example of a table held by a document information database of the document recognition apparatus of the document recognition system as one embodiment of the present invention.
FIG. 31 is a drawing explaining composition of a document discrimination unit of the document recognition apparatus of the document recognition system as one embodiment of the present invention.

The document information DB 21 maintains document information relating to type and description content in which the document ID is recorded for every document ID (i.e., information about what information is described where in a document), and maintains, for example, a table 21*a* which shows correspondence between document ID, and type and description content or the like of a document corresponding to the document ID (document information) according to composition as shown in FIG. 30.

Meanwhile, in this table 21*a*, item name (coordinates, type of character, number of characters) and type of date (Japanese calendar or Western calendar) for every three types of first document ID and second document ID as type and character recognition item (description item) of the document are maintained.

The document judgment unit 22 discriminates document 30, after content of the document 31*a* and 32*a* of the document 30 is confirmed by the confirmation unit 18, based on content of the document ID31*a* and 32*a* being confirmed, and includes a document ID verification unit 22*a*, a definition information discrimination unit 22*b*, and a description content recognition unit 22*c* as shown in FIG. 31.

The document ID verification unit 22*a* discriminates type of document and description content corresponding to the document ID31*a* or the document ID32*a*, (e.g., what items are described where in the document 30 by what type of characters and how many number of characters), based on the table 21*a* maintained in the document information DB21, and specifically, whether or not the document ID31*a* and 32*a* being confirmed by the confirmation unit 18 are present in the document ID of the table 21a maintained in the document information DB21 is verified, and if the same document ID is detected from the table 21a as a result of this verification, type of document and character recognition item (i.e., document information) corresponding to the detected document ID are extracted.

When a document ID same as the document ID31a and 32a is not detected from the table 21a by the document ID verification unit 22a, i.e., content of the document ID31a and 32a of the document 30 is not confirmed by the confirmation unit 18, or when, though being confirmed by the confirmation unit 18, the document ID31a and 32a being confirmed are not present in the table 21a, the definition information discrimination unit 22b discriminates the document 30 based on, for example, the information (definition information) for identifying documents other than the document ID31a and 32a maintained in advance in the document information DB21.

Meanwhile, as definition information, for example, information relating to layout of the document 30 (e.g., information about ruled lines and arrangement of items), or predetermined special symbols (mark) and location thereof and further, information relating to designing of document are considered.

The definition information discrimination unit 22b then extracts document information of the document 30 from the table 21a, based on type of the document 30 being discriminated.

The description content recognition unit 22c recognizes description content other than the document ID31a and 32a described in the document 30 from the image data 40a of the document 30, based on document information of the document 30 discriminated by the document ID verification unit 22a or by the definition information discrimination unit 22b, and the description content recognition unit 22c, for example, causes the display unit 3 shown in above FIG. 12 to display description content being recognized (recognition results) or records it as a data in the memory unit 6.

The judgment unit 23 evaluates, when the document 30 could not be discriminated by the document discrimination unit, whether to cause the scanner apparatus 40 to re-read the document 30 or to cause an operator to input manually description content other than the document ID31a and 32a of the document 30, based on recognition status of the document ID31a and 32a of the document 30 by the recognition unit 15. Manual input procedures by the operator are executed by using, for example, the keyboard 4 or the mouse shown in the FIG. 12

The judgment unit 23 evaluates, for example, when each of the document ID31a and 32a has been recognized by equal to or more than two characters by the recognition unit 15, to cause the scanner apparatus 40 to re-read the document 30 and at the same time, when either of the document ID31a or 32a has not been recognized by equal to or more than three characters, evaluates to cause the operator to input manually.

Specifically, when, for example, there is a wrinkle 23a at portion of document ID31a and 32a of the document 30 as shown in FIG. 32(a), and when, as a result of recognition of the document ID31a and 32a by the recognition unit 15, if two characters could not be recognized with each of the document ID31a and 32a as shown in FIG. 32(b), the judgment unit 23 evaluates that this document 30 should be re-read by the scanner apparatus 40.

However, when there is a wrinkle 23a at the document ID31a of the document 30 as shown in FIG. 33(a) and a personal seal (stamp) 23b is sealed, and further, a writing 23c is made at the document ID32a, and when, as a result of recognition of the document ID31a and 32a by the recognition unit 15, all the characters could not be recognized as shown in FIG. 33(b), the judgment unit 23 evaluates that this document 30 should be input manually by the operator.

When the judgment unit 23 evaluated to be input manually by the operator, manual input processing is notified to the operator by, for example, causing the display unit 3 shown in FIG. 12 to display that intention accordingly.

The image status detection unit 24 is for detecting an image status of each of peripheral area of these document ID31a and 32a (i.e., sheet status of the document 30) including the document ID31a and 32a (i.e., area 31 and 32) in the image data 40a obtained by the scanner apparatus 40 (see FIG. 11), and detects an image status by, for example, calculating a histogram relating to a color in the target area (gradient 0 to 255 of black and white in this case).

Figure 34:
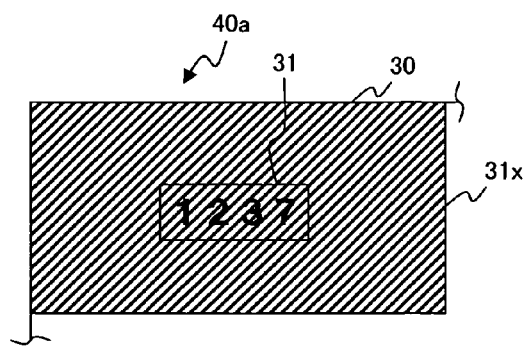
FIG. 34 is a drawing showing one example of an area of image status detection object by an image status detection unit of the document recognition apparatus of the document recognition system as one embodiment of the present invention.
Figure 35A:
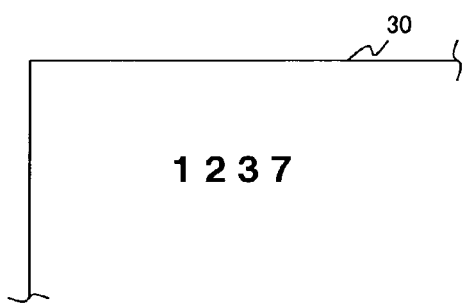
FIG. 35(a) and FIG. 35(b) are drawings each showing one example of image status detection processing by the image status detection unit of the document recognition apparatus of the document recognition system as one embodiment of the present invention, where
Figure 35B:
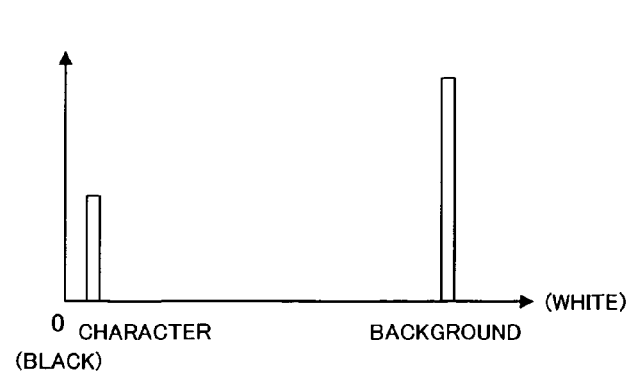

For example, as shown in FIG. 34, if explanation is given for a case where the image status detection unit 24 detects an image status of a predetermined area (shadow area in the drawing) 31x around the area 31 in which the document ID31a is recorded, when there is neither contamination nor wrinkle in the area 30x of the document 30 as shown in FIG. 35(a), a portion representing characters (black) and a portion representing background (white) are expressed in the histogram calculated by the image status detection unit 24 as shown in FIG. 35(b).

Figure 36A:
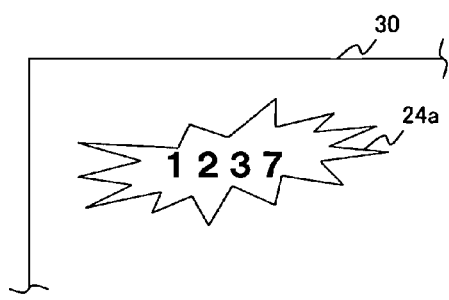
FIG. 36(a) and FIG. 36(b) are drawings each showing one example of detection processing of an image status by the image status detection unit of the document recognition apparatus of the document recognition system as one embodiment of the present invention, where
Figure 36B:
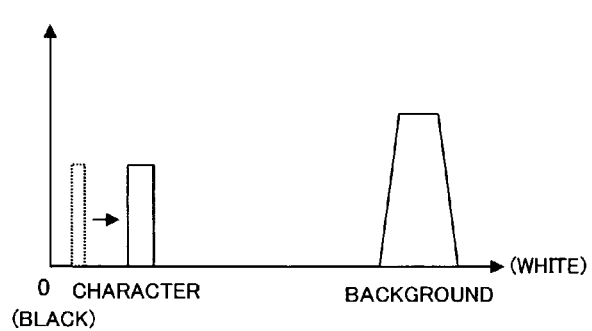

However, when a wrinkle 24a is adhered around the area 31 of the document 30 as shown in FIG. 36(a), the wrinkle 24a acts as noise, and character portion and background portion are affected as depicted in the histogram calculated by the image status detection unit 24 as shown in FIG. 36(b).

In the example shown in FIG. 36(b), compared with the histogram depicted in FIG. 35(b) representing a normal status (document 30 is in good status), area showing character portion becomes thicker and larger and at the same time, approaches background portion. Besides, background portion is deformed to exhibit a trapezoid and area thereof is also increased.

Figure 37A:
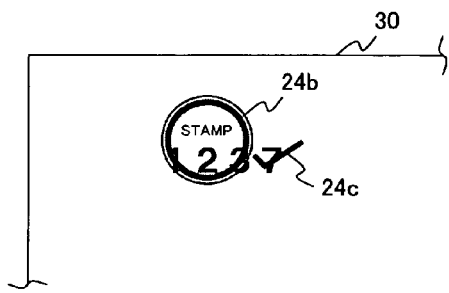
FIG. 37(a) and FIG. 37(b) are drawings each showing one example of detection processing of an image status by the image status detection unit of the document recognition apparatus of the document recognition system as one embodiment of the present invention, where
Figure 37B:
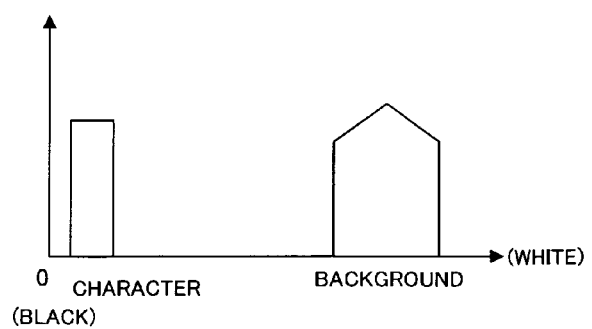
Figure 38A:
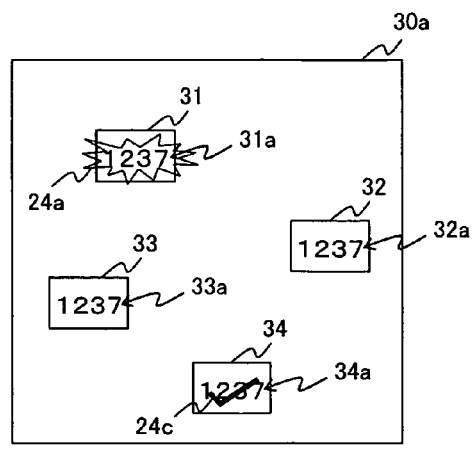
FIGS. 38(a) to 38(e) are drawings each showing one example of detection processing of an image status by the image status detection unit of the document recognition apparatus of the document recognition system as one embodiment of the present invention, where
Figure 38B:
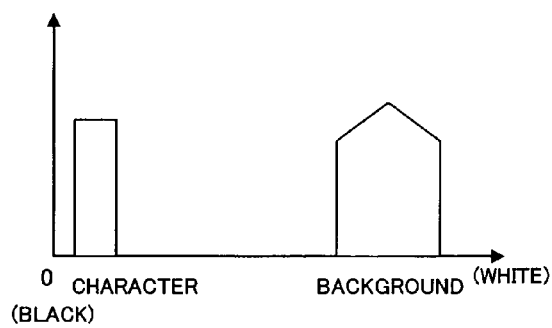
Figure 38C:
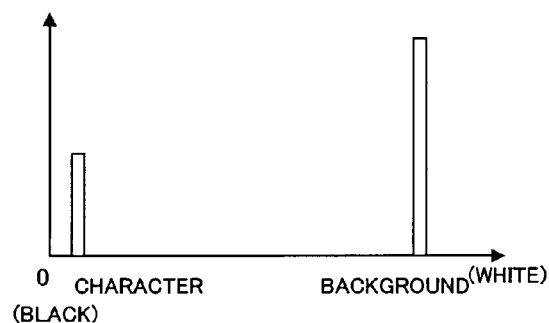
Figure 38D:
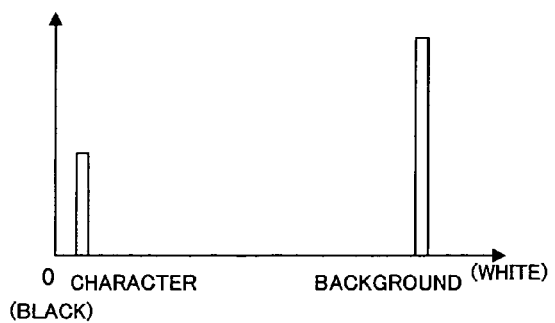
Figure 38E:
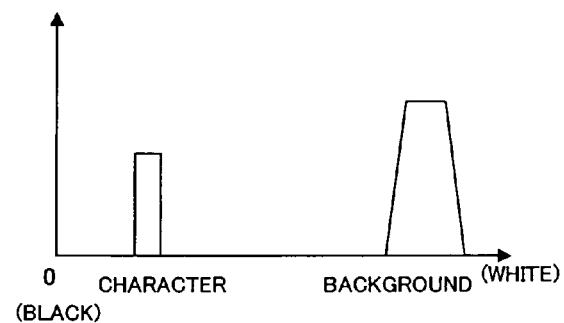

Further, when there is a personal seal 24b or a writing 24c as shown in FIG. 37(a), the personal seal 24b or the writing 24c acts as noises and character portion and background portion are greatly affected in the histogram detected by the image status detection unit 24 as shown in FIG. 37(b).

In the example shown in FIG. 37(b), an area representing character portion becomes extremely thicker and larger with regard to normal status shown in FIG. 35(b) and at the same time, an area representing background portion also becomes extremely thicker and larger.

In this way, with image status detection unit 24, image status (status of the document 30) can be detected surely by calculating a histogram.

The selection unit 25 is for causing the recognition unit 15 to select a document ID for executing character recognition, based on image status detected by the image status detection unit 24.

Here, explanation will be given for operations of the recognition unit 15, the image status detection unit 24, and the selection unit 25 referring to FIGS. 38(a) to 38(e), wherein in the document recognition apparatus 10, the image status detection unit 24 and the selection unit 25 are operated especially when recognition processing is executed for the document 30a in which are recorded equal to or more than three document ID31a to 34a as shown in above shown FIG. 10.

That is, when the extraction unit 14 extracted equal to or more than three document ID31a to 34a, the image status detection unit 24 detects image status of periphery area of each of document ID31*a* to 34*a* including equal to or more than three document ID31*a* to 34*a*.

On this occasion, if there is a wrinkle 24*a* around a first document ID31*a* of the document 30*a* and a writing 24*c* on a fourth document ID34*a* as shown in FIG. 38(*a*), the image status detection unit 24 calculates a histogram for a predetermined area including the first document ID31*a* as shown in FIG. 38(*b*), calculates a histogram for a predetermined area including a second document ID32*a* as shown in FIG. 38(*c*), calculates a histogram for a predetermined area including a third document ID33*a* as shown in FIG. 38(*d*), and calculates a histogram for a predetermined area including a fourth document ID34*a* as shown in FIG. 38(*e*).

Next, the selection unit 25 selects two document ID32*a* and 33*a* based on results of detection of the image status detection unit 24 shown in FIGS. 38(*b*) to 38(*e*).

The recognition unit 15 then executes character recognition of two documents ID32*a* and 33*a* selected by the selection unit 25.

In this way, the selection unit 25 selects an image in good status as character recognition object of the recognition unit 15 based on image status detected by the image status detection unit 24 and therefore, character recognition by the recognition unit 15 can be executed highly efficiently and with higher accuracy. Moreover, errors such as rejection or the like are eventually reduced in recognition processing by the recognition unit 15, discrimination of the document 30 as well as content recognition of the document ID31*a* and 32*a* can be carried out highly efficiently.

[1-5] Example of Operation of Document Recognition Apparatus

Next, explanation will be given for specific example of operations of the document recognition apparatus 10 referring to drawings. In the following explanation, the document 30 is also used as a processing object of the document recognition apparatus 10.

[1-5-1] First Example of Operation

Figure 39:
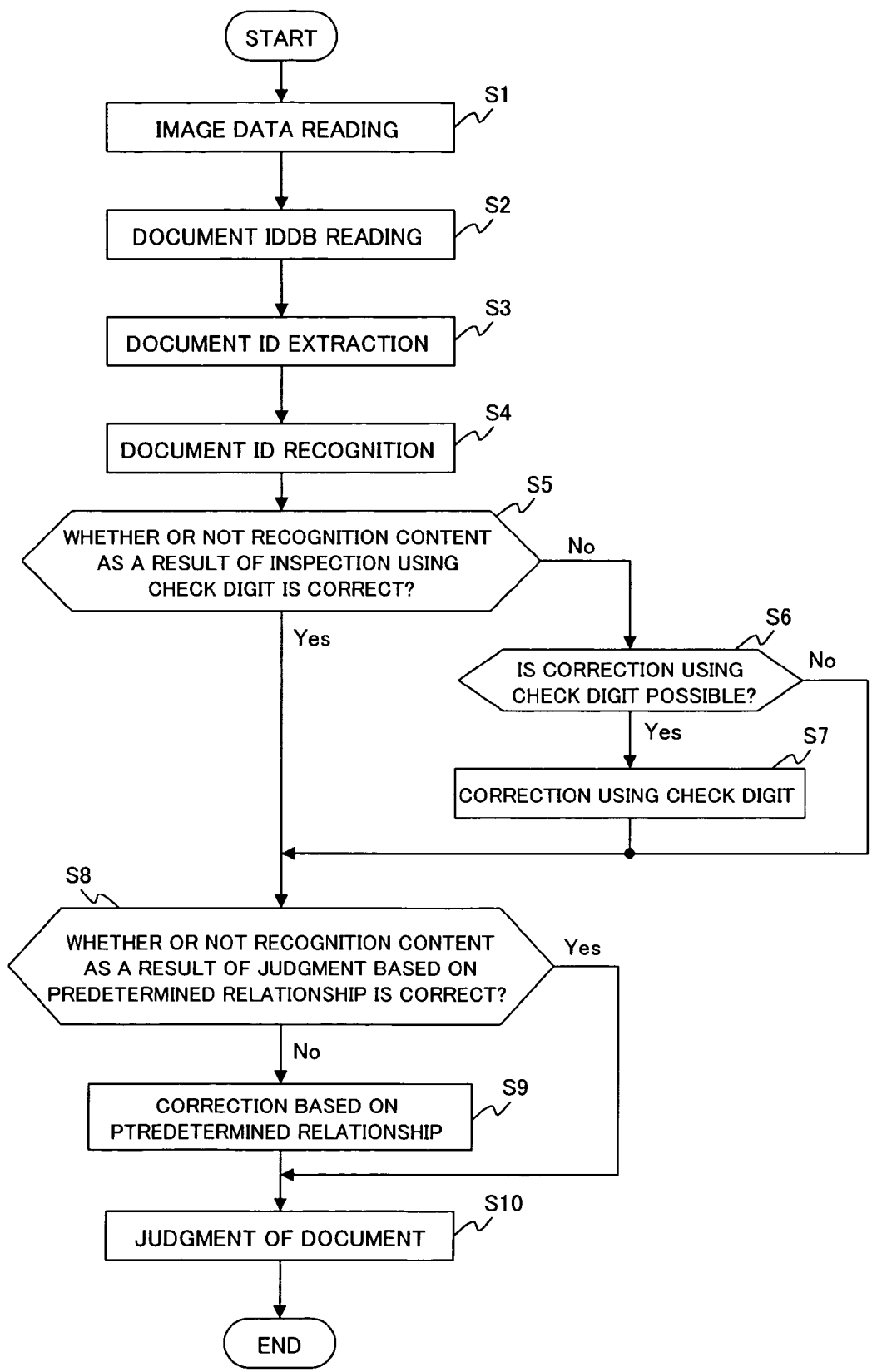
FIG. 39 is a flowchart showing one example of operational procedures of the document recognition apparatus of the document recognition system as one embodiment of the present invention.

First, a first example of operation of the document recognition apparatus 10 (document processing method) is explained referring to the flowchart shown in FIG. 39 (steps S1 to S10). First, the image data reading unit 11 reads an image data 40*a* of the document 30 being read by the scanner apparatus 40 (step S1).

Further, the IDDB reading unit 13 reads information relating to the document ID31*a* and 32*a* of the document 30 from the IDDB 12 (step S2).

The extraction unit 14 then extracts the area 31 in which is recorded the document ID31*a* and the area 32 in which is recorded the document ID32*a* from the image data 40*a* (step S3).

Next, the recognition unit 15 recognizes content (characters) of the document ID31*a* and 32*a* extracted by the extraction unit 14 (step S4).

Next, the inspection unit 16 identifies check digit of each of the document ID31*a* and 32*a* being recognized by the recognition unit 15, based on information relating to the document ID31*a* and 32*a* being read by the IDDB reading unit 13, and inspects to see whether or not each of the document ID31*a* and 32*a* using this check digit is correct (step S5).

Here, if recognition content by the recognition unit 15 is correct (Yes route in step S5) as a result of inspection by the inspection unit 16, the judgment unit 19 of the confirmation unit 18 again evaluates whether or not recognition content by the recognition unit 15 is correct, based on a predetermined relationship (see above shown FIG. 3 to FIGS. 6(*a*) and 6 (*b*)) set in advance between the document ID31*a* and 32*a* (step S8).

In the meantime, when recognition content by the recognition unit 15 is incorrect (No route in step S5), the correction unit 17 evaluates whether or not correction using check digit is possible (step S6), and if evaluated that correction using check digit is possible here (Yes route in step S6), the correction unit 17 corrects content of the document ID31*a* and 32*a* using check digit (step S7).

When correction by correction unit 17 using check digit is not possible (No route in step S6), correction processing of above shown step S7 is skipped.

In a case where correction processing by the correction unit 17 is performed using check digit, the judgment unit 19 of the confirmation unit 18 also evaluates whether or not recognition content of the document ID31*a* and 32*a* to which correction processing by the correction unit 17 is applied is correct, based on such predetermined relationship (step S8).

When recognition content of the document ID31*a* and 32*a* is evaluated to be incorrect (No route in Step 8) as a result of judgment by the judgment unit 19, the mutual correction unit 20 corrects recognition unit of the document ID31*a* and 32*a*, based on such predetermined relationship (step S9).

When recognition content of the document 31*a* and 32*a* is judged to be correct (Yes route in step S8) as a result of judgment by the judgment unit 19, processing of above shown step S9 is skipped.

Lastly, the document discrimination unit 22 evaluates the document 30 (step S10) using recognition content of the document ID31*a* and 32*a*, based on the document information DB21 and terminates the processing.

In this way, according to the first example of operation of the document recognition apparatus 10, since inspection by the inspection unit 16 using check digit and judgment by the judgment unit 19 based on a predetermined relationship are carried out for content of the document ID31*a* and 32*a* being recognized by the recognition unit 15, recognition content is eventually checked twice, thereby recognizing content of the document ID31*a* and 32*a* with higher accuracy.

Moreover, it is possible to cope with correction processing for recognition content by the recognition unit 15 by the correction unit 17 and the mutual correction unit 20, and therefore, content of the document ID31*a* and 32*a* can be recognized more surely.

[1-5-2] Second Example of Operation

Figure 40:
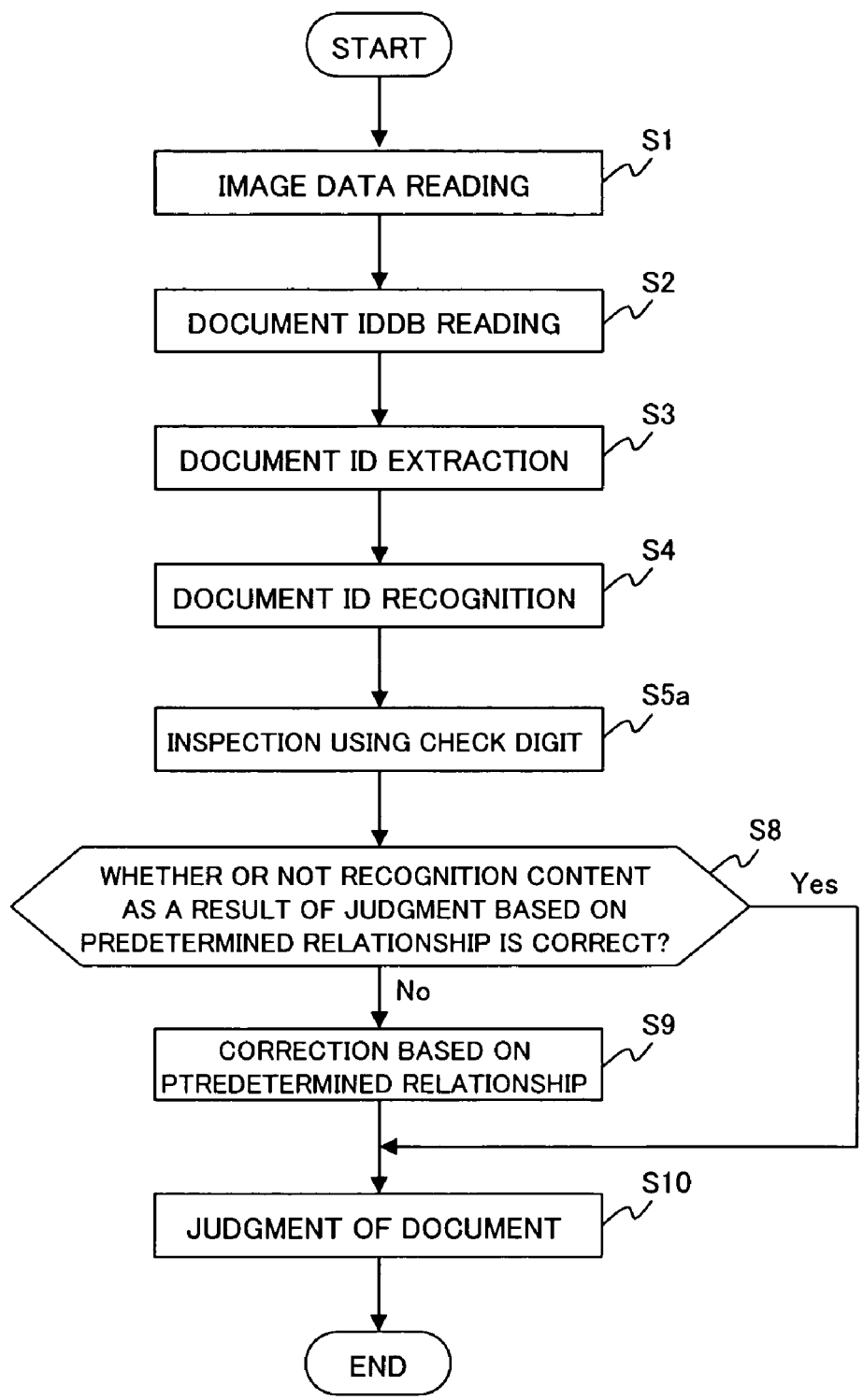
FIG. 40 is a flowchart showing one example of operational procedures of the document recognition apparatus of the document recognition system as one embodiment of the present invention.

Next, a second example of operation of the document recognition apparatus 10 (document processing method) is explained referring to the flowchart shown in FIG. 40 (steps S1 to S4, S5*a* and S8 to S10). Processing steps in FIG. 40 same as processing steps mentioned previously show same or nearly same processing steps mentioned previously, and therefore, detailed explanation thereof will be omitted here.

The second example of operation shown in FIG. 40 is same as the first example of operation shown in above shown FIG. 39 except that correction processing by the correction unit 17 using check digit is not executed.

That is, in the second example of operation shown in FIG. 40, after character recognition of the document ID31*a* and 32*a* by the recognition unit 15 (step S4), the inspection unit 16 executes inspection using check digit (step S5*a*).

However, correction processing by the correction unit 17 based on results of the inspection is not executed here and regardless of results of the inspection by the inspection unit 16, it proceeds to judgment processing by the judgment unit 19 of the confirmation unit 18 (step S8).

Figures 41A, 41B, 41C:
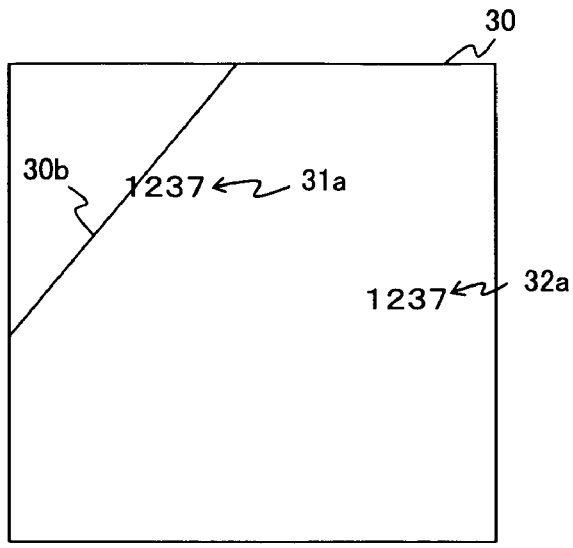
FIGS. 41(a) to 41(c) are drawings each explaining embodiments of processing content of the document recognition apparatus corresponding to the operational procedures shown in FIG. 40, where

For example, as shown in FIG. 41(a), when a part of document ID31a of the document 30 ("1" portion at left end in this case) is not recognized correctly by the recognition unit 15 due to a kinked line 30b caused by folded sheet (expressed by "?" in the drawing), according to the second example of operation, the mutual correction unit 20 executes correction processing as shown in FIG. 41(c) without correction processing by the correction unit 17 using check digit. That is, when check digit of either of the document ID31a or 32a is rejected, the correction unit 17 does not execute correction processing. Here, the mutual correction unit 20 corrects uniquely the document ID31a and 32a to "1237" based on a predetermined relationship that the document ID31a and 32a are identical.

Therefore, according to the second example of operation of the document recognition apparatus 10, it is possible to obtain same operational effects as attained in the first example of operation mentioned above and at the same time, recognition processing can be executed at higher speed than the first example of operation mentioned above as much as correction processing by the correction unit 17 has not been carried out.

[1-6] Effects of the Document Recognition System

In this way, according to the document recognition system 1 as one embodiment of the present invention, in recognizing the document 30 in which a plurality of document ID31a and 32a satisfying a predetermined relationship are recorded, the confirmation unit 18 of the document recognition apparatus 10 evaluates whether or not recognition content by the recognition unit 15 is correct, based on the predetermined relationship set in advance to the document ID31a and 32a, and when evaluated to be incorrect, the confirmation unit 18 corrects the document ID31a and 32a based on the predetermined relationship and confirms it.

Therefore, content of these documents ID31a and 32a are recognized by using a plurality of documents ID31a and 32a without recognizing content of the document ID by merely one document ID, thereby allowing content recognition of the document ID31a and 32a with high-accuracy. In addition, judgment processing whether or not recognition content is correct based on a predetermined relationship between these documents ID31a and 32a, and correction processing are carried out, thereby allowing recognition of content of the document ID31a and 32a with higher accuracy.

Furthermore, since content of the document ID31a and 32a can be recognized with higher accuracy, judgment of the document 30 by the document discrimination unit 22 can be performed with higher accuracy. As a result, with this document recognition system 1, time consuming processing such as re-reading of the document 30 by the scanner apparatus 40, manual input by the operator or the like, which interrupts automatic processing by the document recognition apparatus 10, can be suppressed thereby allowing effective and high-speed discrimination processing of the document 30 with high efficiency and high speed.

Moreover, when content of the document ID31a and 32a has not been confirmed by the confirmation unit 18, the document discrimination unit 22 evaluates the document 30 based on the definition information, and therefore, the document 30 can be discriminated more positively.

Further, since the inspection unit 16 executes inspection using check digit, recognition content of the document ID31a and 32a being recognized by the recognition unit 15 is eventually inspected twice by the inspection unit 16 and by the judgment unit 19 and as a result, more accurate character recognition can be performed.

Note that when correction using check digit is possible, the correction unit 17 corrects content of the document ID31a and 32a using check digits, and therefore, it is possible to correct effectively recognition content by the recognition unit 15 without correction by the mutual correction unit 20.

Further, when check digit of either of the document ID31a or 32a is rejected by the recognition unit 15, the correction unit 17 does not execute correction processing using check digit, and therefore, processing such as inverse operation of check digit, which involves comparatively longer time, can be avoided, and in this case, correction processing for recognition content by the recognition unit 15 can be executed remarkably efficiently while the mutual correction unit 20 executes correction processing.

[2] Variation of the Present Invention

Incidentally, the present invention is not limited to above shown embodiments and modifications can be made without departing from the scope and spirit of the present invention.

[2-1] First Variation

In the embodiment mentioned above, a case where the correction unit 17 of the document recognition apparatus 10 executes correction processing based on check digit is explained, whereas the present invention is not limited to this embodiment, and such a composition that the correction unit 17 executes correction processing based on coincidence degree calculated by the recognition unit 15 may be configured by which similar operational effects as attained by above shown embodiment can be obtained.

Meanwhile, when both the document ID31a and 32a are evaluated to be incorrect as a result of inspection by the inspection unit 16, it is preferable that the correction unit 17 executes correction processing based on coincidence degree calculated by the recognition unit 15.

That is, when each of documents ID31a and 32a of the document 30 is respectively "1237" and "2964" as shown in FIG. 42(a), it is considered that document ID31a is recognized to be "1737" by the recognition unit 15 as shown in FIG. 42(b) and the document ID32a is recognized as "2984".

On this occasion, when it is evaluated that both of documents ID31a and 32a are incorrect according to the results of inspection by the inspection unit 16 using check digit as shown in FIG. 42(c) (expressed by consistence "X" in the drawing), for the document ID31a, the correction unit 17 corrects second digit from the left end "7" that has the lowest coincidence degree among "1737" to second place coincidence degree "2" (i.e., corrected to "1237"), and causes it to undertake inspection by the inspection unit 16. Then, when evaluated to be correct by the inspection unit 16 as shown in FIG. 42(c) (expressed by consistence "-" in the drawing), this numeric character is considered to be document ID31a.

On the other hand, for the document ID32a, right end "4" with the lowest coincidence degree among "2984" is corrected to second place coincidence degree "9" (i.e., corrected to "2989").

Then, when evaluated to be incorrect as a result of inspection by the inspection unit 16 again, third digit from the left end "8" with second lowest coincidence degree among "2984" being recognized first by the recognition unit 15 is corrected to "6" with second place coincidence degree (i.e., corrected to "2964").

Then, subjected again to inspection by the inspection unit and when evaluated here to be correct, this numeric character is considered to be document ID32a.

With this consideration, similar effects as attained by above-mentioned embodiments can be obtained.

[2-2] Second Variation

Figures 43A, 43B:
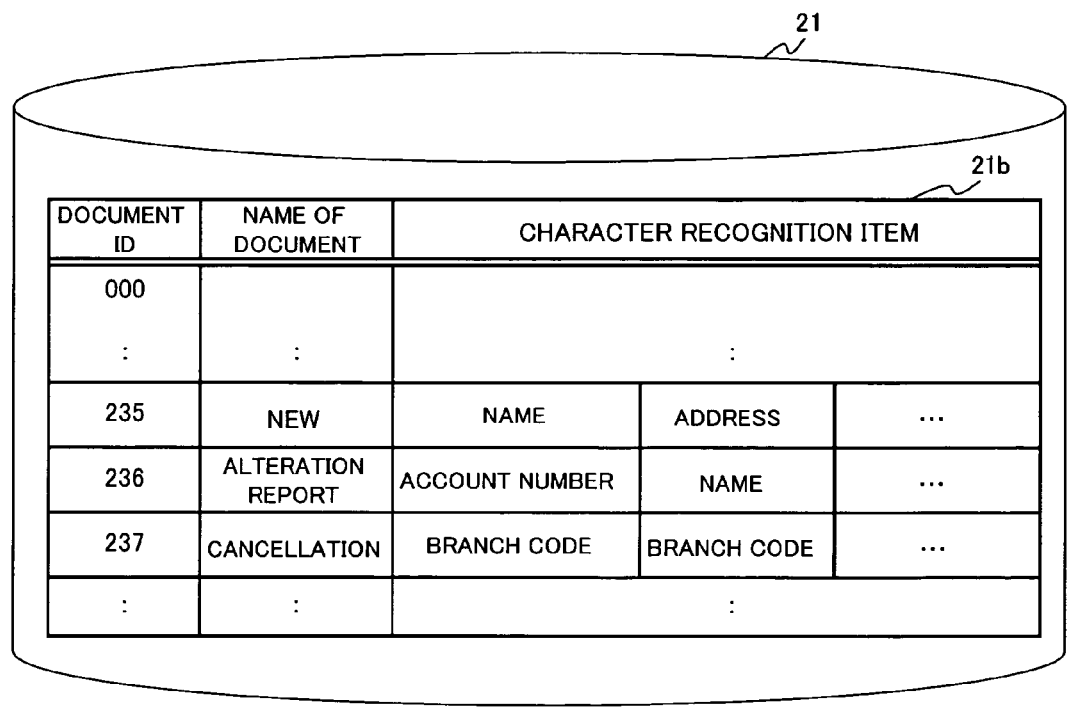
FIG. 43(a) and FIG. 43(b) are drawings each explaining one example of correction processing by the mutual correction unit of the document recognition apparatus as a variation of the present invention, where

Although the composition used in the above-mentioned embodiment is such that when recognition content by the recognition unit 15 is evaluated to be incorrect by the judgment unit 19, the mutual correction unit 20 of the confirmation unit 18 executes correction processing without fail, the present invention is not limited to this composition and for example, when a relationship that the document ID31a and 32a are identical is satisfied as shown in FIG. 43(a), and when check digit is rejected by the recognition unit 15 in each of these documents ID31a and 32a (see "?" at the left end in this case), and document information maintained by the document information DB21a (table 21b in this case) is constituted by a portion excluding check digit of the document ID31a and 32a, the mutual correction unit 20 does not execute correction processing.

That is, the confirmation unit 18 confirms lower three digits "237" only as the document ID31a and 32a and on this occasion, the document discrimination unit 22 evaluates the document 30 based on the document ID31a, 32a "237" and the table 21b.

Accordingly, in this case, correction processing by the mutual correction unit 20 can be omitted thereby allowing highly efficient recognition of the document ID31a and 32a and at the same time, judgment processing of the document 30 can be executed at high-speed by as much as correction processing by the mutual correction unit 20 being saved.

[2-3] Third Variation

Although an example, where the mutual correction unit 20 of the confirmation unit 18 executes correction processing based on a predetermined relationship set in advance between the document ID31a and 32a, is explained in above-mentioned embodiment, the present invention is not limited to this example and for example, such a composition may be configured that the mutual correction unit 20 executes correction based on coincidence degree calculated by the recognition unit 15.

For example, as shown in FIG. 44(a), when the document ID31a and 32a are identical in the document 30, and recognition result by the recognition unit 15 results in "8" as shown in FIG. 44(b) due to that a kinked line 30b is caused to "3" of third digit from the left end of the document ID32a, the mutual correction unit 20 executes correction processing based on coincidence degree for the numeric character third digit from the left end for each of the document ID31a and 32a as shown in FIG. 44(c).

In this example, coincidence degree of the first place character of each of the document ID31a and 32a shown in FIG. 44(c) is compared, and "8" of the document ID32a is corrected to "3" in an attempt to confirm a numeric character third digit from the left end by "3" with the highest coincidence degree.

With this consideration, similar effects as attained by above-mentioned embodiment can be obtained.

Meanwhile, when coincidence degree of "3" in the document ID31a (90% in this case) and coincidence degree of "8" in the document ID32a (90% in this case) are identical as shown in FIG. 44(d), the mutual correction unit 20 calculates a difference between coincidence degree for content with first place coincidence degree and coincidence degree for content with second place coincidence degree ("50%" for document ID31a and "20%" for document ID32a in this case), calculated by the recognition unit 15 for each of document ID31a and 32a, and executes correction so as to confirm content of the first place of the document ID31a and 32a with greater difference as content of the document ID31a and 32a.

In this example, "8" of the document ID32a is corrected to "3" in an attempt to confirm a numeric character third digit from the left end by "3" of the document ID32a with the larger difference of coincidence degree.

With this consideration, content of the document ID31a and 32a can be recognized more positively.

Further, when a table 15b as shown in FIG. 44(e) showing coincidence degree calculated by the recognition unit 15 (coincidence degree for first place and second place candidate characters) is prepared in advance, and the mutual correction unit 20 compares coincidence degree shown in FIG. 44(c) or FIG. 44(d) with coincidence degree shown in this table 15b, and if there is a difference, evaluation may be made that the character with different coincidence degree is incorrect, and similar effects as attained by above-mentioned embodiment can also be obtained with this configuration.

That is, in this example, since coincidence degree of "8" of the document ID32a (see FIG. 44(c), FIG. 44(d)) is different from coincidence degree of "8" of the table 15b, the mutual correction unit 20 evaluates that this "8" is incorrect and corrects it to "3".

With this consideration, similar effects as attained by above-mentioned embodiment can be obtained.

[2-4] Fourth Variation

An example where the judgment unit 23 executes judgment processing based on recognition status of the document ID31a and 32a by the recognition unit 15 is explained in above-mentioned embodiment, such a composition may be configured that the judgment unit 23 determines whether or not manual input by the operator should be made based on the number of times of re-reading by the scanner apparatus 40 of the document 30.

Figure 45:
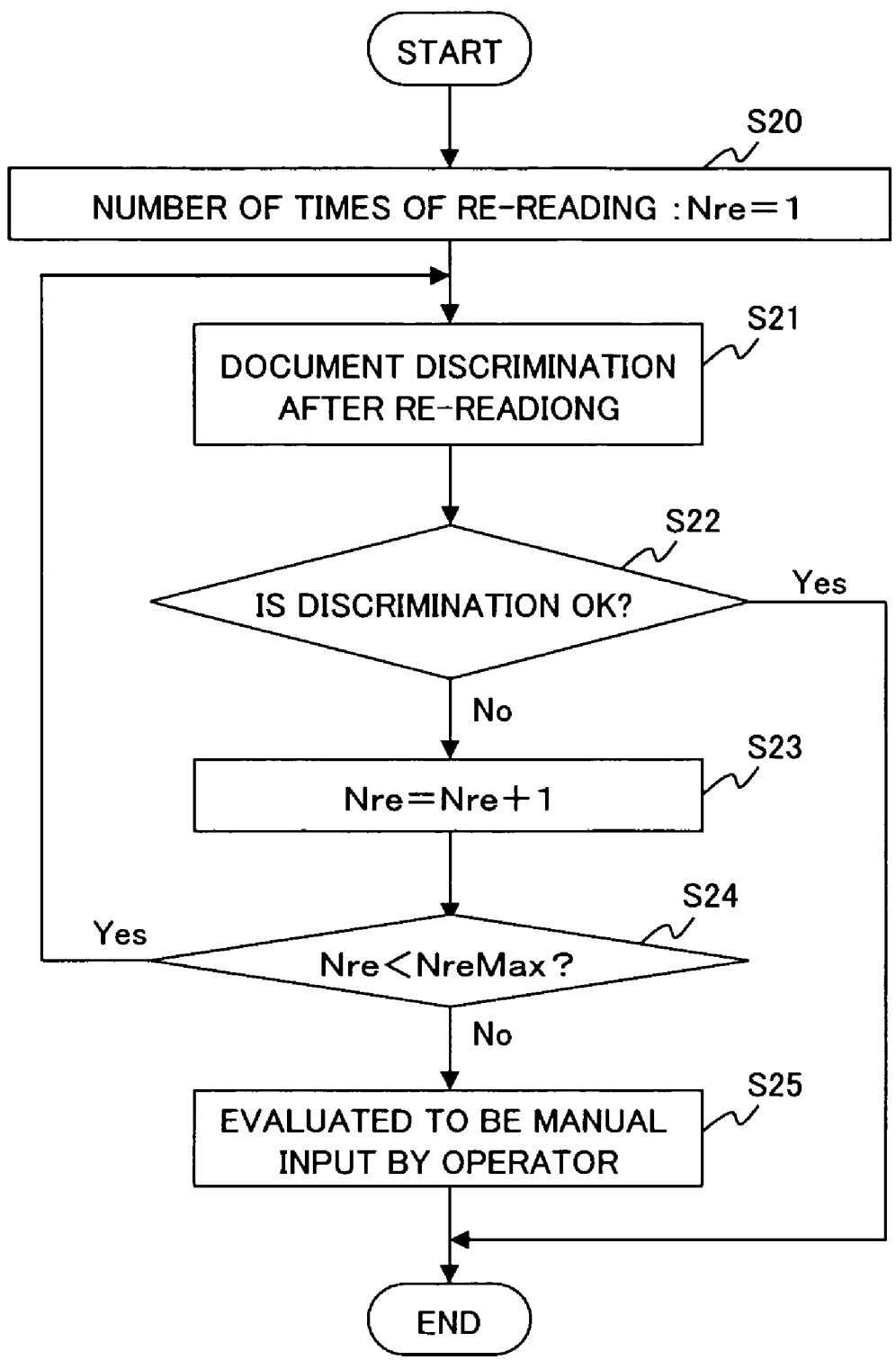
FIG. 45 is a flowchart explaining operational procedures of judgment processing by the judgment unit of the document recognition apparatus as a variation of the present invention.

That is, when judgment by the document discrimination unit 22 could not make judgment for the first time as shown in the flowchart of FIG. 45 (steps S20 to S25), the number of times of re-reading (Nre) is set to "1" (step S20), the judgment unit 23 causes the scanner apparatus 40 to execute re-reading, and processing by the document discrimination unit 22 is executed (step S21).

When the document could be evaluated here (Yes route in step S22), the processing is terminated.

However, if the document could not be evaluated even here (No route in step S22), the judgment unit 23 counts up once the number of times of re-reading (step S23) and further evaluates whether or not the number of times of re-reading is smaller than the predetermined number of times (NreMax) (step S24).

When the number of times of re-reading is smaller than the predetermined number of times (No route in step S24) processing of above-mentioned steps S21 to S24 are executed again.

Meanwhile, when the number of times of re-reading exceeds the predetermined number of times (Yes route in step S24), the judgment unit 23 evaluates that this should be of manual input by the operator (step S25) thereby terminating the processing.

With this consideration, judgment processing of a document can be executed highly efficiently and with higher accuracy similar to above-mentioned embodiment.

Figure 46:
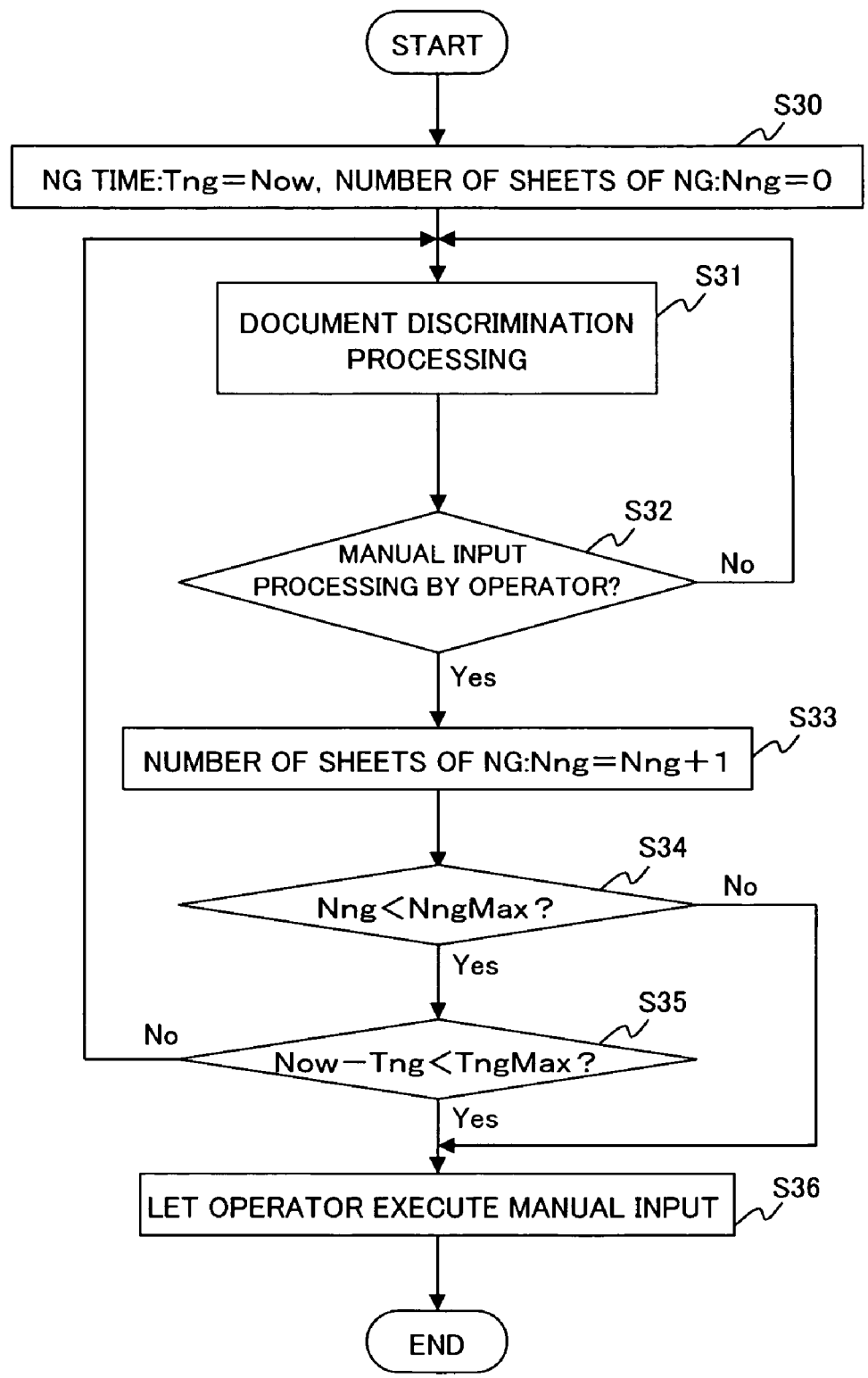
FIG. 46 is a flowchart explaining operational procedures of judgment processing by the judgment unit of the document recognition apparatus as a variation of the present invention.

Further, manual input by the operator so judged by the judgment unit 23 is, for example, preferably executed after a predetermined time as shown in the flowchart (steps S30 to S36) in FIG. 46 or after the predetermined number of sheets is reached, and with this consideration, manual input processing by the operator can be executed collectively to some extent, and efficient recognition processing can be executed without interrupting automatic recognition processing by the document recognition apparatus 10.

That is, the document discrimination unit 22 executes judgment processing (step S31) from processing time Tng (NG time) is present time (Now), and initial status where the number of sheets of the document (Number of NG sheets: Nng) which could not be evaluated by the document discrimination unit 22 and should be input manually by the operator is "0" (step S30), and then the judgment unit 32 evaluates whether or not to cause the operator to input manually (step S32).

When not evaluated to be manual input processing as a result of this judgment (Yes route in step S32), the document discrimination unit 22 evaluates the next document (step S31).

Meanwhile, when evaluated to be manual input processing (No route in step S32), the judgment unit 23 counts up once the number of NG sheets (step S33) to evaluate whether or not number of NG sheets is smaller than the predetermined number of sheets (step S34).

Here, when number of NG sheets is equal to or more than the predetermined level (No route in step S34), the judgment unit 23 evaluates that manual input by the operator should be executed and causes the operator to execute manual input processing (step S36).

In contrast, when number of NG sheets is smaller than the predetermined level (Yes route in step S34), the judgment unit 23 evaluates whether or not present time reached the predetermined time (TngMax) set in advance (step S35).

Here, when the predetermined time is not reached yet (No route in step S35), processing of above-mentioned steps S31 to S34 are executed again.

Meanwhile, when the predetermined time is reached (Yes route in step S35), the judgment unit 23 executes processing of above-mentioned step S36.

In this way, manual input by the operator can be executed after a predetermined time from initiation of document recognition processing or after number of NG sheets reached a predetermined number of sheets.

[2-5] Fifth Variation

Although an example, where the confirmation unit 18 confirms content of a document ID based on a predetermined relationship set in advance between a plurality of document IDs is explained in above-mentioned embodiment, the present invention is not limited to this example and for example, the confirmation unit 18 may confirm content of a document ID based on image status detected by the image status detection unit 24, and similar effects as attained by above-mentioned embodiment can be obtained with this configuration.

That is, when equal to or more than three document IDs are recorded in a document of recognition target, and when the judgment unit 19 of the confirmation unit 18 evaluates that contents of these document IDs are incorrect, the image status detection unit 24 detects each of image status in periphery area of equal to or more than three document IDs, and the confirmation unit 18 may exclude the document ID with poor image status being detected from recognition object and may confirm content of a document ID with good image status as content of a document ID described in the document.

With this consideration, confirmation processing by the confirmation unit 18 can be executed highly efficiently and with higher accuracy.

[3] Others

Meanwhile, functions as the image data reading unit 11, the IDDB reading unit 13, the extraction unit 14, the recognition unit 15, the inspection unit 16, the correction unit 17, the confirmation unit 18, the document discrimination unit 22, the judgment unit 23, the image status detection unit 24, and the selection unit 25 of the document recognition apparatus 10 as mentioned above may be realized by the computer (including CPU, information processing apparatus and various terminal equipments) while executing a predetermined application program (document recognition program).

The program is provided in a form being recorded in a computer readable record medium, for example, a flexible disc, a CD (CD-ROM, CD-R, CD-RW or the like), a DVD (DVD-ROM, DVD-RAM, DVD-R, DVD-RW, DVD+R, DVD+RW or the like). In this case, the computer reads from the record medium the document recognition program, transfers it to an internal memory or an external memory, and stores it for use.

Further, the program may be once recorded in a memory unit (record medium), for example, a magnetic disc, an optical disc, a magnetic optical disc or the like and be provided from the memory unit to the computer via a communication line.

In this case, the computer is a concept including a hardware and OS (Operating System) and denotes the hardware operated under control of OS.

Further, in the case OS is unnecessary and the hardware is operated by the application program alone, the hardware itself corresponds to the computer.

The hardware is equipped with at least a microprocessor such as CPU and a means for reading the computer program recorded in the record medium.

The application program as above-mentioned document recognition program includes a program code to cause the computer as mentioned above to realize functions as the image data reading unit 11, the IDDB reading unit 13, the extraction unit 14, the recognition unit 15, the inspection unit 16, the correction unit 17, the confirmation unit 18, the document discrimination unit 22, the judgment unit 23, the image status detection unit 24, and the selection unit 25. Besides, a part of these functions may be realized by an OS in lieu of an application program.

Incidentally, as for the record medium as the embodiment, various computer readable media such as an IC card, a ROM cartridge, a magnetic tape, a punch card, an internal memory of the computer (memory such as RAM or ROM), an external memory or a printed material or the like on which is recorded a symbol such as barcode or the like may be utilized in addition to above-mentioned flexible disc, CD, DVD, magnetic disc, optical disc, and magnetic optical disc.

[4] Industrial Applicability of the Present Invention

As mentioned above, according to the present invention, for a document in which a plurality of document IDs that satisfies a predetermined relationship is recorded, a plurality of document IDs can be recognized highly accurately based on such predetermined relationship.

Accordingly, the present invention is preferably used for a document recognition system, when a plurality of document groups different in types is processed, a recognition document in which an identification information for identifying document groups is inserted at front line of each of document group, the identification document is first identified prior to processing of each document in the document group, and after types and number of sheets of document groups subsequent to this identification document are confirmed, processing of these document groups are carried out, and it is considered that applicability of this invention is extremely high.

Figure 47:
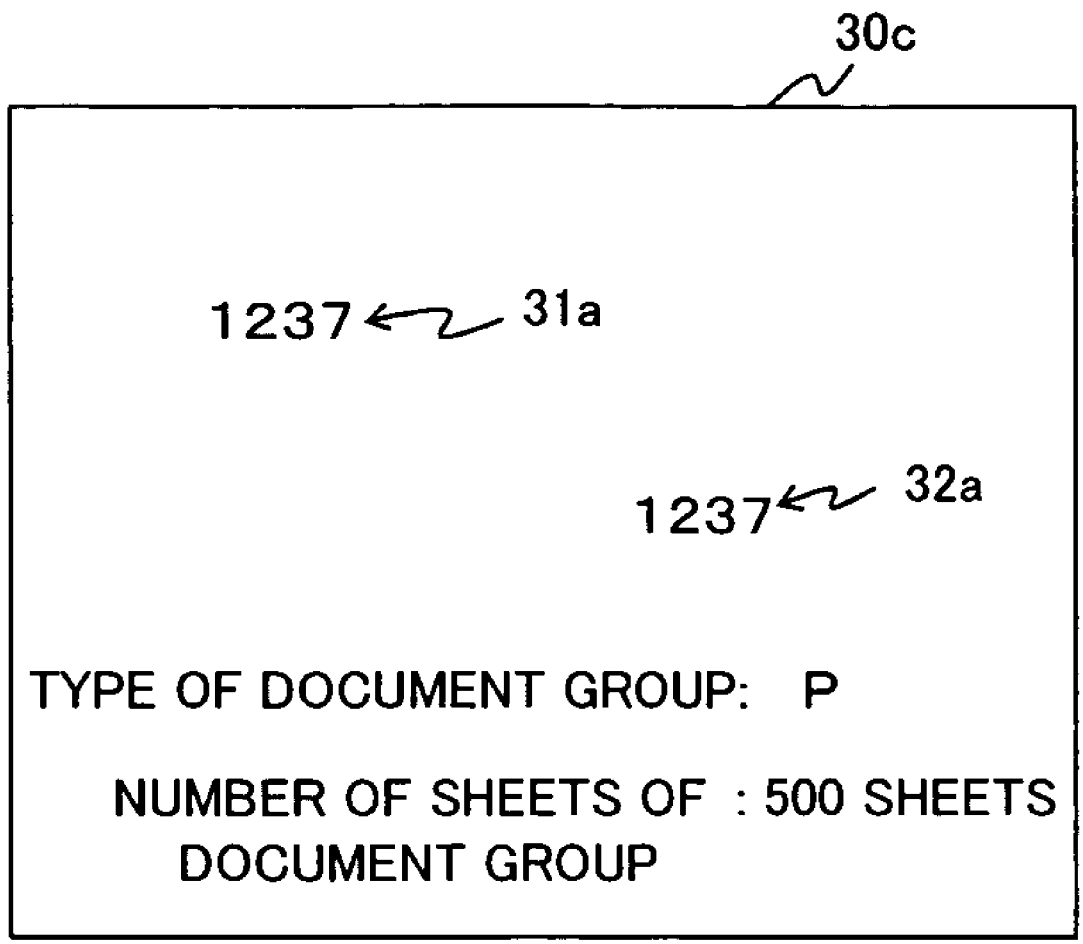
FIG. 47 is a drawing showing one example of a document (document for identification) of the document recognition apparatus as a variation of the present invention.
Figure 48:
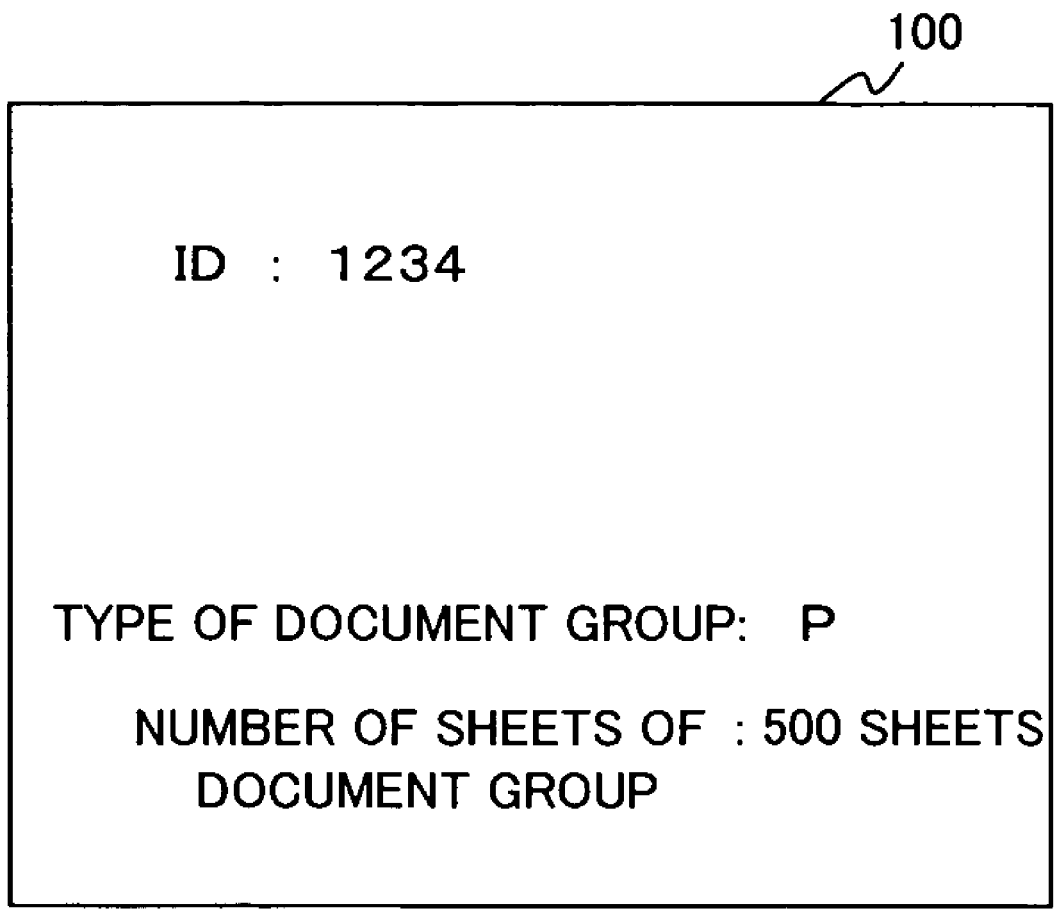
FIG. 48 is a drawing showing one example of a document to which conventional document recognition apparatus is applicable.

On this occasion, use of, for example, an identification document 30c as shown in FIG. 47 is considered in this document recognition system. That is, a plurality of documents ID31a and 32a is recorded in the identification document 30c and at the same time, type ("P" in this case) and the number of sheets ("500 sheets" in this case) of the subsequent document group are recorded as the identification information.

According to the present invention, recognition processing for a plurality of document groups different in types can be executed highly accurately and highly efficiently with the use of such identification document 30c.

What is claimed is:

1. A medium processing apparatus comprising:
   an extraction unit for extracting, from an image data obtained by reading a medium on which a plurality of information items satisfying a predetermined relationship are indicated in a plurality of areas, each of said plurality of information items;
   a recognition unit for recognizing content of each of said plurality of information items extracted by said extraction unit; and
   a confirmation unit which (i) evaluates whether or not content of said plurality of information items recognized by said recognition unit is correct based on said predetermined relationship, and (ii) confirms, if the evaluation reveals a positive result, content of said plurality of information items as recognized by said recognition unit, and (iii) executes, if the evaluation reveals a negative result, correction of recognition content recognized by said recognition unit, based on said predetermined relationship, to confirm content of said plurality of information items.

2. The medium processing apparatus according to claim 1 further comprising a medium discrimination unit for discriminating said medium based on content of the information after content of said information is confirmed by said confirmation unit.

3. The medium processing apparatus according to claim 2, wherein said medium discrimination unit discriminates, when content of said information is not confirmed by said confirmation unit, said medium based on definition information of said medium.

4. The medium processing apparatus according to claim 2 further comprising a judgment unit for judging whether to cause said medium discrimination unit to re-read said medium that could not be discriminated or to cause an operator to input manually according to recognition status by said recognition unit of information of the medium, when said medium could not be discriminated by said medium discrimination unit.

5. The medium processing apparatus according to claim 4, wherein said judgment unit, when the number of times of re-reading of said medium exceeds a specified value, decides that said plurality of information items held in said medium are to be manually input.

6. The medium processing apparatus according to claim 2 further comprising:
   an inspection unit for inspecting content of each of said plurality of information items recognized by said recognition unit based on check digit, while each of said plurality of information items contains said check digit; and
   a correction unit for correcting content of information using said check digit, when content of the information recognized by said recognition unit is incorrect, as a result of inspection using the check digit by the inspection unit,
   wherein, when only check digit is rejected or not recognized by said recognition unit in each of said plurality of information items, said correction unit does not execute correction using check digit and said medium discrimination unit discriminates said medium using content excluding check digit in each of said plurality of information items.

7. The medium processing apparatus according to claim 1 further comprising an inspection unit for inspecting content of each of said plurality of information items recognized by said recognition unit based on a check digit, while each of said plurality of information items contains said check digit.

8. The medium processing apparatus according to claim 7, further comprising a correction unit for correcting content of information using said check digit, when content of the information recognized by said recognition unit is incorrect, as a result of inspection by said inspection unit using the check digit.

9. The medium processing apparatus according to claim 8, wherein when said recognition unit recognizes characters as said information, coincidence degree is calculated for every candidate character, and when characters as information recognized by said recognition unit are incorrect as a result of said inspection by said inspection unit, said correction unit corrects said information using said candidate characters based on said coincidence degree.

10. The medium processing apparatus according to claim 9, wherein said plurality of information items are constituted of a first information and a second information, and when both said first information and said second information are incorrect as a result of said inspection by said inspection unit, said correction unit executes said correction.

11. The medium processing apparatus according to claim 8, wherein when a check digit of any of said plurality of information items is rejected or not recognized by said recognition unit, said correction unit does not execute correction using check digit.

12. The medium processing apparatus according to claim 1, wherein said recognition unit is configured to calculate, when content of said information is recognized, coincidence degree with regard to the content, and
   wherein when content of each of said plurality of information items recognized by said recognition unit does not satisfy said predetermined relationship, then said confirmation unit evaluates that recognition content by said recognition unit is incorrect and executes said correction based on said coincidence degree of said recognition unit for a portion where said content in each of said plurality of information items is different.

13. The medium processing apparatus according to claim 12, wherein said recognition unit is configured in such that when content of said information is recognized by said recognition unit, first place content with highest said coincidence degree among a plurality of candidates is adopted as a recognition content with regard to the information, and wherein when content of each of said plurality of information items recognized by said recognition unit does not satisfy said predetermined relationship, then said confirmation unit calculates a difference between coincidence degree for the first place content with highest said coincidence degree in said recognition unit and coincidence degree for the second place content for each of said plurality of information items, and executes said correction based on calculated difference of each of said plurality of information items.

14. The medium processing apparatus according to claim 1 further comprising:

an image status detection unit for detecting, when equal to or more than three information are extracted by said extraction unit, status of an image in each of peripheral areas of these equal to or more than three information including said equal to or more than three information in said image data; and a selection unit for selecting at least two information from said equal to or more than three information based on image status detected by the image status detection unit, wherein said recognition unit recognizes content of said at least two information items selected by said selection unit.

15. The medium processing apparatus according to claim 1 further comprising:

an image status detection unit for detecting, when said confirmation unit evaluated that content of said plurality of information items recognized by said recognition unit is incorrect and when the number of said plurality of information items is equal to or more than three, status of an image of each of peripheral areas of these equal to or more than three information including said equal to or more than three information, wherein said confirmation unit confirms content of said plurality of information items based on image status detected by the image status detection unit.

16. A medium processing method performed by a processor, comprising:

extracting, from an image data obtained by reading a medium on which:

a plurality of information items satisfying a predetermined relationship are indicated in a plurality of areas, each of said plurality of information items:

recognizing content of each of said plurality of information items extracted by said extracting;

evaluating whether or not content of said plurality of information items recognized by said recognizing is correct based on said predetermined relationship;

confirming, if the evaluation reveals a positive result, content of said plurality of information items as recognized by said recognizing; and executing, if the evaluation reveals a negative result, correction of recognition content recognized by said recognizing, based on said predetermined relationship, to confirm content of said plurality of information items.

17. A medium processing system comprising:

a medium on which a plurality of information items satisfying a predetermined relationship are indicated in a plurality of areas;

a scanner apparatus for obtaining an image data of the medium by reading the medium; and a medium processing apparatus for recognizing content of said information based on said image data obtained by the scanner apparatus, wherein the medium processing apparatus including;

an extraction unit for extracting each of said plurality of information items from said image data;

a recognition unit for recognizing content of each of said plurality of information items extracted by said extraction unit; and a confirmation unit which (i) evaluates whether or not content of said plurality of information items recognized by said recognition unit is correct based on said predetermined relationship, and (ii) confirms, if the evaluation reveals a positive result, content of said plurality of information items as recognized by said recognition unit, and (iii) executes, if the evaluation reveals a negative result, correction of recognition content recognized by said recognition unit, based on said predetermined relationship, to confirm content of said plurality of information items.

18. The medium processing system according to claim 17, wherein a first information and a second information are indicated as said plurality of information items to said medium, each of characters constituting said first information and each of characters constituting said second information are constituted of different characters each having one-on-one correspondence relationship, and said confirmation unit of said medium processing apparatus executes said judgment based on said correspondence relationship.

19. The medium processing system according to claim 18, wherein said first information and said second information of said medium are constituted of characters with recognition rate not less than a prescribed value by said recognition unit of said medium processing apparatus, and further, said correspondence relationship is determined by said recognition rate.

20. A computer readable recording medium on which is recorded a medium processing program to cause a computer to realize, based on an image data obtained by reading a medium on which a plurality of information items satisfying a predetermined relationship are indicated in a plurality of areas, said medium processing program causing said computer to function as:

an extraction unit for extracting each of said plurality of information items from said image data;

a recognition unit for recognizing content of each of said plurality of information items extracted by said extraction unit; and a confirmation unit which (i) evaluates whether or not content of said plurality of information items recognized by said recognition unit is correct based on said predetermined relationship, and (ii) confirms, if the evaluation reveals a positive result, content of said plurality of information items as recognized by said recognition unit, and (iii) executes, if the evaluation reveals a negative result, correction of recognition content recognized by said recognition unit, based on said predetermined relationship, to confirm content of said plurality of information items.

* * * * *